US006757730B1

(12) United States Patent
Lee et al.

(10) Patent No.: US 6,757,730 B1
(45) Date of Patent: Jun. 29, 2004

(54) METHOD, APPARATUS AND ARTICLES-OF-MANUFACTURE FOR NETWORK-BASED DISTRIBUTED COMPUTING

(75) Inventors: Peter Lee, New York, NY (US); James Bernardin, New York, NY (US)

(73) Assignee: DataSynapse, Inc., New York, NY (US)

( * ) Notice: Subject to any disclaimer, the term of this patent is extended or adjusted under 35 U.S.C. 154(b) by 325 days.

(21) Appl. No.: 09/583,244

(22) Filed: May 31, 2000

(51) Int. Cl.[7] ............................................. G06F 15/173
(52) U.S. Cl. ..................... 709/226; 709/201; 709/203; 709/244
(58) Field of Search ............................... 709/104, 201, 709/226, 244, 202

(56) References Cited

U.S. PATENT DOCUMENTS

| | | | |
|---|---|---|---|
| 5,031,089 A | 7/1991 | Liu et al. | |
| 5,377,350 A | 12/1994 | Skinner | |
| 5,548,726 A | 8/1996 | Pettus | |
| 5,594,915 A | 1/1997 | Atalla | |
| 5,740,549 A | 4/1998 | Reilly et al. | |
| 5,790,789 A | * 8/1998 | Suarez | 709/202 |
| 5,796,945 A | 8/1998 | Tarabella | |
| 5,819,033 A | 10/1998 | Caccavale | |
| 6,098,091 A | * 8/2000 | Kisor | 709/202 |
| 6,112,225 A | 8/2000 | Kraft et al. | |
| 6,304,910 B1 | 10/2001 | Roach et al. | |
| 6,418,462 B1 | * 7/2002 | Xu | 709/201 |
| 6,449,734 B1 | * 9/2002 | Shrivastava et al. | 714/15 |
| 6,452,915 B1 | * 9/2002 | Jorgensen | 370/338 |

FOREIGN PATENT DOCUMENTS

| | | |
|---|---|---|
| WO | WO 01/14691 A2 | 3/2001 |

OTHER PUBLICATIONS

London et al., "Popcorn– A Paradigm for Global Computing," Thesis University Jerusalem, Jun. 1998.
Neary, M O et al. "Javelin: Parallel computing on the Internet." Future Generations Computer Systems, Elsevier Science Publishers, Amsterdam, NL, vol. 15, No. 5–6, Oct. 1999.
Takagi, H. et al. "Ninflet: A Migratable Parallel Objects Framework Using Java." Concurrency: Practice and Experience, John Wiley and Sons, GB, vol. 10, No. 11–13, Feb. 1998.
Woodward, J. et al. "A broadband network architecture for residential video services feautruing distributed control of broadband switches and video dial tone functionality".
Allan Bricker, Michael Litzkow and Miron Livny Condor Technical Summary, Computer Sciences Department, University of Wisconsin, Madison Jan. 28, 1992.

* cited by examiner

Primary Examiner—Glenton B. Burgess
Assistant Examiner—Kevin Parton
(74) Attorney, Agent, or Firm—Patterson, Belknap

(57) ABSTRACT

An Internet-based, secure, distributed task-brokering and parallel-processing method/system/article-of-manufacture advantageously leverages under-utilized network-based computing resources for bandwidth-intensive and/or computationally-intensive problems, and provides significant cost advantages over traditional coarse-grained parallel computing techniques.

16 Claims, 21 Drawing Sheets

```
package com.xyz.example;
import com.webproc.task.*;

public class BigSearchInput implements TaskInput {
    // define fields public or private
    public String search;
    public String location;
    public BigSearchInput() { }   // always have a default
    public BigSearchInput(String search, String location) {
        this.search = search;
        this.location = location;
    }
}
```

*FIG. 17*

```
package com.xyz.example;
import com.webproc.task.*;

public class BigSearchOutput implements TaskOutput {
    // define fields public or private
    public String[] results;
    public BigSearchOutput() { }  // always have a default
    public BigSearchOutput(String[] results) {
        this.results = results;
    }
}
```

*FIG. 18*

```
package com.xyz.example;
import com.webproc.task.*;
import java.util.Properties;

public class BigSearchTask implements Task {
  public TaskOutput doTask(TaskInput in) {

// Cast and get data.
    BigSearchInput input = (BigSearchInput) in;
    String search = input.search;
    String loc = input.location;

// Create your own TaskOutput implementation.
    BigSearchOutput output = new BigSearchOutput();

// Perform task
    output.results = getResults(search, loc);
    return output;
  } public String[] getResults(String search, String loc) {
    ...
  }
}
```

*FIG. 19*

```
package com.xyz.example;
import com.webproc.task.*;
import java.util.Hashtable;

public class BigSearchInputProcess implements TaskInputProcess {
    public void prepareInputs(Hashtable context,
                    TaskInputCollection tasks) {

// Get job properties (You load them in the xml file).

String searchStr = context.get("search_string").toString;
        DataSource db = (DataSource) context.get("data_source");
        String locations[] = db.getSearchLocations();
        BigSearchInput input = null;
        for (int i = 0; i < locations.length; i++) {
            input = new BigSearchInput(search, locations[i]);
            tasks.pushTask(input);
        }
    }
}
```

*FIG. 20*

```
package com.xyz.example;
import com.webproc.task.*;
import java.util.Hashtable;

public class BigSearchOutputProcess implements TaskOutputProcess {
    public void processResults(Hashtable context,
            TaskOutputCollection tasks) {

// Get job properties and objects.
        Vector results = (Vector) context.get("results");

// Pop tasks from collection (stack).
        BigSearchOutput output =
            (BigSearchOutput) tasks.popTask();
        while (output != null) {
            // process or collect results
            results.add(output.results);
            // Get another task.
            output = (BigSearchOutput) tasks.popTask();
        }
    }
}
```

*FIG. 21*

METHOD, APPARATUS AND ARTICLES-OF-MANUFACTURE FOR NETWORK-BASED DISTRIBUTED COMPUTING

CROSS-REFERENCE TO RELATED APPLICATION

This application claims priority of a co-pending U.S. provisional application, filed May 12, 2000, entitled METHODS, APPARATUS, AND ARTICLES-OF-MANUFACTURE FOR NETWORK-BASED DISTRIBUTED COMPUTING, bearing and naming the inventors herein.

FIELD OF THE INVENTION

The present invention relates generally to the fields of distributed computing and Internet-based applications and services. More particularly, the invention relates to methods, apparatus and articles-of-manufactures relating to the collection, organization, maintenance, management and commercial exploitation of network-connected, distributed computing resources.

BACKGROUND OF THE INVENTION

Distributed (or parallel) computing is a well-established field. Over the past few decades, thousands of distributed computing architectures have been proposed, and hundreds gave been constructed and evaluated.

Distributed computing architectures are typically characterized as being either "coarse-grained" or "fine-grained," depending upon the size or complexity of the individual processing elements (or "nodes") that perform the computational work. In a typical coarse-grained, distributed computing architecture, the individual processing elements are generally fully functional computing elements, such as single-chip microprocessors, capable of individually performing a variety of useful tasks. The fine-grained approach, by contrast, typically relies on a large number of processing elements, each of which has very limited computational capabilities.

Perhaps the best known fine-grained parallel architecture is The Connection Machine, manufactured by the now-defunct Thinking Machines Corporation. In The Connection Machine, thousands of very-simple processing elements were connected by a highly-efficient message-routing network. Even though individual processing elements lacked the ability to perform much useful on their own, the efficiency of the message-routing network made it possible to cooperatively deploy large numbers of processing elements, on certain problems.

Unlike The Connection Machine, coarse-grained parallel computing systems seldom have the luxury of communication networks that operate with latencies at, or near, the clock speed of individual processing elements. The more sophisticated processing elements used in a coarse-grained distributed processing systems typically cannot be packed into a small volume, like a single chip, board or chassis. As a result, communications must travel across chip-to-chip, board-to-board, or even chassis-to-chassis boundaries, as well as greater physical distances, all of which causes inherent and unavoidable increases in latency. Because of these inherent communication limitations, coarse-grained parallel architectures have, for many years, been viewed by persons skilled in the art as useful only for "computationally intensive"—as opposed to "communication intensive"—tasks. A typical computationally intensive task is prime factorization of large integers.

Recently, there have been several efforts to exploit the resources of the world's largest coarse-grained distributed computing system—the Internet. The thrust of these efforts has been to apply traditional coarse-grained distributed processing approaches to utilize idle processing resources connected to the World-Wide Web ("www"). The first reported application of these www-based methods was signal analysis, as part of a search for extra-terrestrial intelligence ("SETI"). Several years later, a group at the University of California, Santa Barbara, described the use of web-based distributed parallelism for prime factorization, and other computationally intensive problems. Both of these reported prior-art efforts clearly embrace and exemplify traditional, coarse-grained parallelism thinking, namely, that such parallelism is only useful for computationally intensive, as opposed to communication intensive, problems. See G. Moritz, *SETI and Distributed Computing*, www.people.fas.harvard.edu/gmoritz/papers/s7.html (1998) ("Distributed computing is well suited to the search for extraterrestrial civilizations for several reasons. First, the problem itself consists of small blocks of data which each require a large amount of processing. Since CPU time, not bandwidth, is the major requirement of the SERENDIP data analysis, distributed computing via the Internet will be very feasible"); A. D. Alexandrov, *SuperWeb: Towards a Global Web-Based Parallel Computing Infrastructure*, citeseer.nj.nec.com/cachedpage/80115 (1997), at 1 ("We expect this approach to work well for non-communication intensive applications, such as prime number factorization, Monte-Carlo and coarse-grained simulations, and others").

The explosive growth of the Web over the past few years has created a huge demand for high-performance, web-centric computing services. Today, such services are typically rendered using mainframe computers (or other high-performance servers), connected to the Web via a T1 line (operating at 1.544 Mb/s). Unfortunately, T1 connectivity is very costly.

At the same time, consumers are increasingly migrating toward high-bandwidth, always-on Web connections, such as those offered by DSL and cable-modem providers. The inventors herein have observed that, as consumer connections to the Internet get faster and cheaper, the ratio of bandwidth-to-cost is far more favorable in the consumer (e.g., DSL and cable-modem) market than in the high-performance corporate (e.g., T1) market. In other words, even at the present time, individuals with high-speed Internet connections are paying far less per unit of bandwidth than high-demand corporate users of T1 lines. Moreover, economies of scale are likely to further drive-down the cost of mass-marketed, high-speed Internet connections, thus making the existing cost disparity even greater.

Accordingly, it would be highly desirable if users of high-performance, web-centric computing services could take advantage of the increasingly cheaper, high-speed, mass-marketed Internet connection services. It would also be highly desirable if such users could take advantage of the millions of often-idle computing resources (e.g., PCs, workstations and other devices) linked to the Internet through such always-on, high-speed, mass-marketed connections. Finally, it would be highly-desirable if owners of such often-idle computing resources could be compensated for use of their resource' always-on, high-speed Internet connections during otherwise idle periods of time. The invention, as described below, satisfies these and other needs.

SUMMARY OF THE INVENTION

In light of the above, one object of the present invention relates to software infrastructure designed to capture a generalized problem-solving capability, handle data throughputs in excess of 100× the productivity of the SETI effort, require no access to a worker's local disk drive (to assuage security concerns) and motivate retail Internet users to participate by paying them in cash or higher-value non-monetary compensation (frequent flyer miles, lottery, discounted products/services, etc.).

Another object of the invention relates to a distributed networking software system that enables thousands, potentially scaled to millions, of consumer PCs on the Internet to be networked together to function as a Virtual Super Computer ("VSC").

Another object of the invention relates to a distributed networking software system that enables a "CPU/bandwidth" website exchange to be operated, which web site anonymously and securely brokers demand from web-centric applications seeking integrated (i) data processing and/or (ii) high-bandwidth access to the Internet with retail supply of such resources. Such "brokering" platform aggregates CPU capability at a commercially-significant unit cost advantage versus the equivalent CPU horsepower of a high-end supercomputer, and aggregates Internet bandwidth access at a commercially-significant cost advantage versus T1, T3, or OC3 high-speed connectivity.

Another object of the invention relates to a distributed networking software system that enables on-demand computing power, with functionality similar to an electric utility, where corporate users can "plug in" to the network's website exchange for powering a wide range of web applications, thereby capitalizing on a distributed problem-solving approach.

Another object of the invention relates to a distributed networking software system that enables flexibility in client deployment, where clients who have unique security concerns or applications which do not require Web integration can licence the software platform for deployment on an intranet or extranet basis only.

In accordance with the invention, the enabling platform is preferably a lightweight overlay that is intended to integrate into virtually any corporate network configuration. Similarly, each retail PC downloads a lightweight installation which invisibly runs in the background and automatically visits a broker website seeking work, whenever the PC's screensaver is activated.

Another aspect of the invention relates to a multi-tiered server/meta-server architecture configured to support various system management, load balancing, disaster recovery, and security features of the invention.

Another aspect of the invention relates to security. Security is preferably thoroughly integrated into the framework of the invention using a conservative "restricted" approach. Unlike the SETI effort, the invention contemplates use by a variety of parties with potentially conflicting commercial interests; thus, the invention cannot rely on a network of friendly volunteers, and must assume that any one of its retail participants could potentially be hostile in intent.

The invention preferably makes heavy use of security. features available in the Java 2 Platform. The Java Secure Socket Extension (JSSE) and Java Authentication and Authorization Service (JAAS), as well as other Internet-standard cryptography and security APIs provide a rich set of tools to use in connection with the invention. The customer is given flexibility in selecting among different levels of security protection. Preferably, the customer' code will be "cloaked" to protect it from decompilation attacks, and signed using private key and predetermined certificate authority ("CA"). In addition, lightweight messages between the customer and servers/brokers will be encrypted. These messages may contain the disguised locations of Java instruction code and data inputs. In turn, these heavyweight items are then also authenticated. Result data is preferably signed by the client program, and server/broker acts as the CA for the worker and customer relationships, and the server/broker preferably only accepts completed work from registered workers who have their private keys registered with the system.

Accordingly, generally speaking, and without intending to be limiting, one aspect of the invention relates to a method for performing distributed, bandwidth-intensive computational tasks, comprising: providing Internet access to at least one broker processor, the at least one broker processor configured to receive jobs from Internet-connected customers; receiving a job from a customer via the Internet; in response to receipt of the job from the customer, directing a plurality of Internet-connected worker-processors to perform a plurality of worker tasks related to the received job; awaiting execution of the worker tasks, the execution characterized by a predominance of worker processor-Internet communication activity; and, upon completion of the execution, confirming the completion of the execution via the Internet. During execution, the plurality of worker processors are preferably collectively utilizing, on average, at least 25% of their total available communication bandwidth, and possibly as much as 30%, 35%, 40%, 50%, 60%, 70% or more. At least part of a worker's execution may include: (i) searching the Internet in accordance with a search query supplied by the customer; (ii) creating an index; (iii) creating a database; (iv) updating a database; (v) creating a report; (vi) creating a backup or archival file; (vii) performing software maintenance operations; comparing objects downloaded from the Internet; (viii) processing signals or images downloaded from the Internet; (ix) broadcasting audio and/or video to a plurality of destinations on the Internet; and/or sending e-mail to a plurality of destinations on the Internet.

Again, generally speaking, and without intending to be limiting, another aspect of the invention relates to a method for reducing the cost of performing a bandwidth-intensive job on the Internet, the method comprising: (i) transmitting a job execution request to a broker processor over the Internet; (ii) selecting, in response to the job execution request, a plurality of Internet-connected worker processors to be used in executing the job, the selection of worker processors being performed, at least in part, based on one or more bandwidth-related consideration(s); and (iii) using the selected worker processors to execute, at least in part, the job. The worker processor selection is preferably based, at least in part, on one or more bandwidth-related consideration selected from the list of: (i) the types of Internet connections-installed on candidate worker processors; (ii) the locations of candidate worker processors; (iii) the time of day; and (iv) historical performance statistics of candidate worker processors.

Again, generally speaking, and withoutt intending to be limiting, another aspect of the invention relates to a method for exploiting unused computational resources on the Internet, comprising: (i) recruiting prospective worker processors over the Internet, the recruiting including: (a) providing Internet-accessible instructions; (b) providing Internet-downloadable worker processor software; (c) providing an Internet-accessible worker processor operating agreement; and (d) storing a plurality of work processor preferences; (ii) maintaining a registry of worker processors, the maintaining including: (a) storing a plurality of URLs used to address the worker processors; (b) storing a plurality of worker processor profiles, the profiles including information related to hardware and software configurations of the worker processors; and (c) storing a plurality of worker processor past performance metrics; (iii) selecting a plurality of worker processors to collectively execute a job, the selecting being based, at least in part, on worker processor past performance metrics maintained by the worker processor registry; and (iv) using the selected plurality of worker processors to execute the job. At least some of the prospective worker processors may be connected to the Internet via a satellite connection, a fixed wireless connection, and/or a mobile wireless connection. Recruiting prospective worker processors may further include specifying the type and amount of compensation to be provided in exchange for use of worker processor resources, and/or providing an on-line means of accepting the worker processor operating agreement. Maintaining a registry of worker processors may further include determining the performance of worker processors listed in the registry by executing one or more benchmark programs on the worker processors, and optionally updating the worker processor past performance metrics in accordance with measured benchmark program performance statistics. Selecting may be further based, at least in part, on one or more bandwidth-related consideration(s) selected from the list of: (i) the types of Internet connections installed on the worker processors; (ii) the locations of the worker processors; (iii) the time of day; and (iv) one or more of the stored preferences.

Again, generally speaking, and without intending to be limiting, another aspect of the invention relates to a method for reselling Internet bandwidth associated with individual DSL-connected Internet workstations, the method comprising: (i) entering on-line-completed operating agreements with a plurality of DSL-connected Internet users, the agreements providing for use of a plurality of DSL-connected Internet workstations controlled by the users; (ii) executing a customers's distributed task, using a plurality of the DSL-connected Internet workstations; (iii) storing, for each of the DSL-connected Internet workstations used in the distributed task execution, a bandwidth utilization metric; (iv) compensating the DSL-connected Internet users whose workstations where used in the distributed task execution, the compensation being determined, at least in part, based upon the bandwidth utilization metrics associated with the workstations used in the distributed task execution; and (v) charging the customer whose distributed task was executed using the DSL-connected Internet workstations. The customer is preferably charged, at least in part, based upon the bandwidth utilization metrics associated with the workstations used in executing the customer's distributed task. Executing a customer's distributed task may include: (i) receiving an execution request message from the customer over the Internet; (ii) processing the execution request using an Internet-connected broker processor; and (iii) initiating distributed execution of the task by sending messages, over the Internet, to a plurality of the DSL-connected Internet workstations. The compensation is preferably determined, at least in part, by one or more metric(s) selected from the list consisting of: (i) the amount of real time used by the DSL-connected Internet workstations in executing the distributed task; (ii) the amount of processor time used by the DSL-connected Internet workstations in the executing the distributed task; (iii) the amount of primary storage used by the DSL-connected Internet workstation in the executing the distributed task; (iv) the amount of secondary storage used by the DSL-connected Internet workstation in executing the distributed task; (v) the time of day during which the execution occurred; and (vi) the geographic location(s) of the DSL-connected Internet workstations. The plurality of DSL-connected Internet workstations may operate in accordance with any one of the following protocols: ADSL, HDSL, IDSL, MSDSL, RADSL, SDSL, and VDSL (or other similar, or future, protocols).

Again, generally speaking, and without intending to be limiting, another aspect of the invention relates to a method for reselling Internet bandwidth associated with individual cable modem-connected Internet workstations, the method comprising: (i) enrolling a plurality of cable modem-connected Internet users by installing worker processor software on a plurality of cable modem-connected Internet workstations controlled by the users; (ii) using the installed worker processor software to execute a distributed task on a plurality of the cable modem-connected Internet workstations; (iii) using the installed worker processor software to compute, for each workstation used in the distributed task execution, a billing metric determined, at least in part, by the amount of data communication involved in executing the distributed task; (iv) compensating the cable modem-connected Internet-users whose workstations where used in the distributed task execution; (v) charging a customer who requested execution of the distributed task; and (vi) wherein the compensating and charging are performed, at least in part, using one or more of the computed billing metric(s), and wherein, for each distributed task executed, the amount charged to the customer exceeds the sum of all amounts paid to the cable modem-connected Internet users.

Again, generally speaking, and without intending to be limiting, another aspect of the invention relates to a method for executing jobs, comprised of a plurality of tasks, in a networked computing environment, the method comprising: (i) providing networked access to at least one broker processor, the broker processor configured to receive a job from a user, unpack the job into a plurality of executable tasks, and direct a plurality of worker processors to initiate execution of the tasks; (ii) maintaining performance metrics for worker processors; (iii) monitoring completion of tasks by the worker processors and, upon completion, updating the performance metrics; (iv) using the performance metrics to select, at least in part, worker processors to initiate execution of additional tasks; and (v) using the performance metrics to determine, at least in part, the charges to be billed to the user for execution of the job. The method may further include (a) using said performance metrics to detect aberrant performance of worker processors executing tasks; and (b) terminating execution of tasks on worker processors that display aberrant performance.

Further aspects of the invention relate to detection of aberrant worker processor performance, and to use of such detected aberrant performance in maintaining system security and integrity in a distributed processing environment. Worker processor performance metrics may be used to detect aberrant performance by processors executing tasks. In other words, if a processor is expected to complete a task in 1 minute, and the task is not competed in 2 minutes, one may conclude that the processor is (or may be) exhibiting aberrant performance. Another way to detect aberrant performance is to compare the performance of multiple worker processors executing similar tasks. In other words, when similar processors spend significantly different amounts of time (either real time or CPU time) executing similar jobs, it may be concluded that those significantly slower processors are exhibiting some sort of aberrant performance.

Because aberrant performance may suggest a security breach on the aberrant-performing worker processor(s), such processor(s) may be selectively disabled and precluded from receiving further task allocations.

Additional aspects of the invention relate to systems, structures and articles-of-manufacture used, or useful, in connection with all, or part, of the above-described methods.

Still further aspects of the invention relate to different combinations or subcombinations of the above-described elements and features in accordance with the teachings of the instant invention.

BRIEF DESCRIPTION OF THE FIGURES

The above as well as other, aspects, features and advantages of the present invention are exemplified below, with reference to a presently-preferred embodiment, the SecureWebProc system (hosted by Website www.datasynapse.com), described under the heading Detailed Description below, which Description is intended to be read in conjunction with the following set of figures, in which:

FIG. 17 contains exemplary datasynapse/SecureWebProc TaskInput code;

FIG. 18 contains exemplary datasynapse/SecureWebProc TaskOutput code;

FIG. 19 contains exemplary datasynapse/SecureWebProc Task code;

FIG. 20 contains exemplary datasynapse/SecureWebProc TaskInputProcess code; and, FIG. 21 contains exemplary datasynapse/SecureWebProc TaskOutputProcess code.

DETAILED DESCRIPTION OF THE PREFERRED EMBODIMENT(S)

Figure 1:
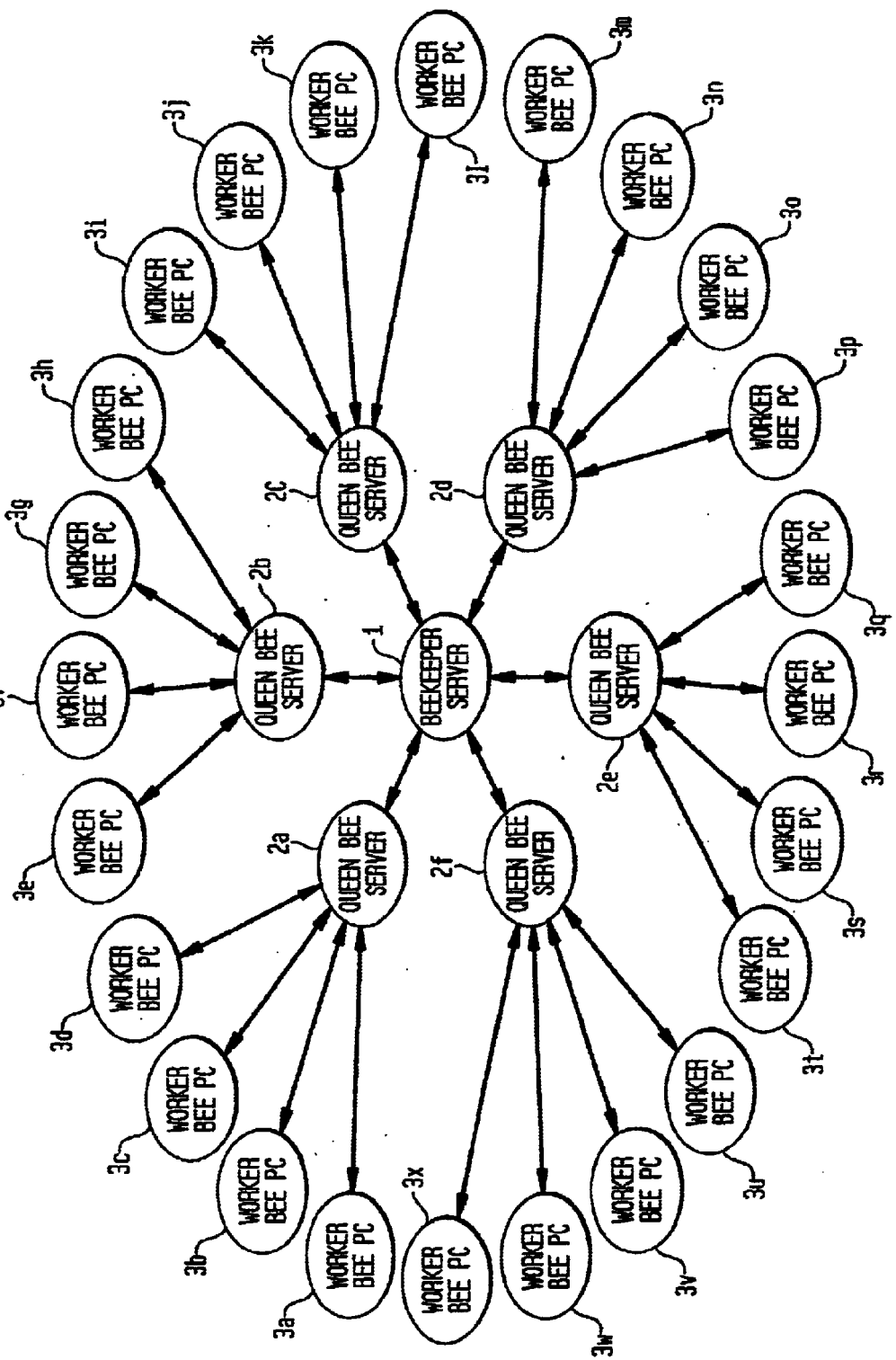
FIG. 1 exemplifies the communication between various workers and brokers/servers in the datasynapse/SecureWebProc environment.

Reference is made to FIG. 1, which illustrates several aspects of the datasynapse network. As depicted, an illustrative distributed computing network comprises at least one Beekeeper server 1, a plurality of Queen bee servers 2a–f, each in communication with a beekeeper server, and a plurality of Worker bee PC's 3a–x, each in communication with one or more queen bee servers. The datasynapse network of Beekeeper(s) and Queen bees is preferably managed by a facilities outsource provider, and incorporates all of the redundancy and security features which other mission-critical users are afforded, including mirroring of servers, 24/7/365 uptime, etc.

Beekeeper 1 acts as the central exchange and preferably has three core responsibilities: (i) maintain customer registry; (ii) maintain worker bee registry; and (iii) load balance among the cluster of Queen bees. Beekeeper 1 is preferably designed to scale according to network supply. Because Queen bees 2a–f are each typically absorbing the bulk of high-level tasking and data throughput, Beekeeper 1 is able to concentrate on efficiently maintaining a master registry and load balance.

Beekeeper 1 automatically interrogates worker bees 3a–x that visit the datasynapse.com website and responds according to whether the worker is a narrowband, broadband but unregistered visitor, or authorized broadband visitor. Once registered, worker bees 3a–x automatically visit Beekeeper 1 upon activation to solicit the list of designated Queen bees 2a–f where the worker should seek work. This enables the datasynapse network to dynamically interrogate a worker and load balance, assigning a designated Queen bee server for all future interaction with the datasynapse network, defaulting to a secondary backup in the event the primary Queen bee experiences difficulties or has no work to perform. This designation relieves Beekeeper 1 from congestion issues and accelerates the overall distributed network throughput.

The Queen bees 2a–f manage the brokering of jobs from clients (not depicted) to worker bees 3a–x, once a client has been registered at Beekeeper 1 and designated to a Queen bee, similar to the Worker bee process outlined above. Queen bee 1 is preferably designed to scale up-to at least 10,000 Worker bees 3a–x.

Figure 2:
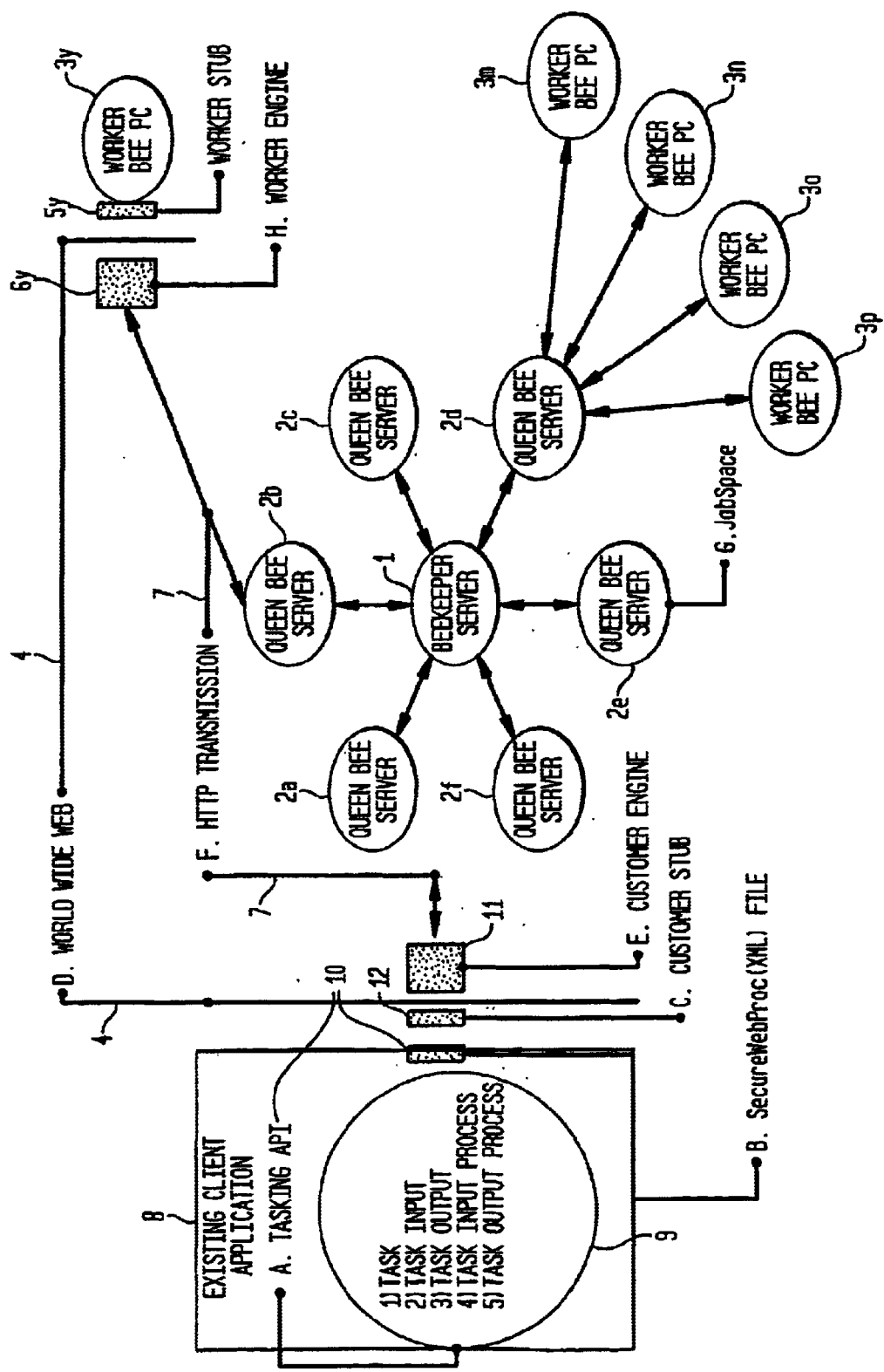
FIG. 2 illustrates further details of the datasynapse/SecureWebProc environment.

Reference is now made to FIG. 2, which illustrates further details of the datasynapse/SecureWebProc environment. The datasynapse software seamlessly and easily integrates within existing or new applications which can capitalize on distributed processing. Tasking API 8 requests the user to organize its distributed problem in five intuitive classes 9, which collectively capture a simple yet flexible tasking semantic. The datasynapse software permits the user to bind a tasking implementation to a specific run-time job submission via a SecureWebProc markup language (see, also, FIGS. 17–21). The customer downloads and installs, anywhere in its network, the lightweight SecureWebproc customer stub 12, which supports the above-described API.

Customer Engine 11 automatically packages tasks into job+entries. Customer stub 12 will preferably automatically download the most recent SecureWebProc engine 11 at time of job submission. Such engine download enables datasynapse to update and enhance its functionality on a continuous basis, without interfering with customer applications 8, or forcing the customer to continuously re-install the software.

All communications are preferably transported by standard TCP/IP 4. JobSpace is the virtual boundary for the total datasynapse.com exchange of work components.

Illustrative worker engine 6y automatically processes tasks. Worker engine 6y is preferably automatically downloaded by a corresponding worker stub 5y at the start of executing a task. Such engine download enables datasynapse to update and enhance its functionality on a continuous basis without interfering with worker applications, or forcing the worker 3y to continuously re-install the software. Worker stub 5y is downloaded from the datasynapse.com website at registration. It is preferably a lightweight program which senses when a customer's screensaver program is on, and then visits the designated Queen bee server at intervals to take work, if available.

Figure 3:
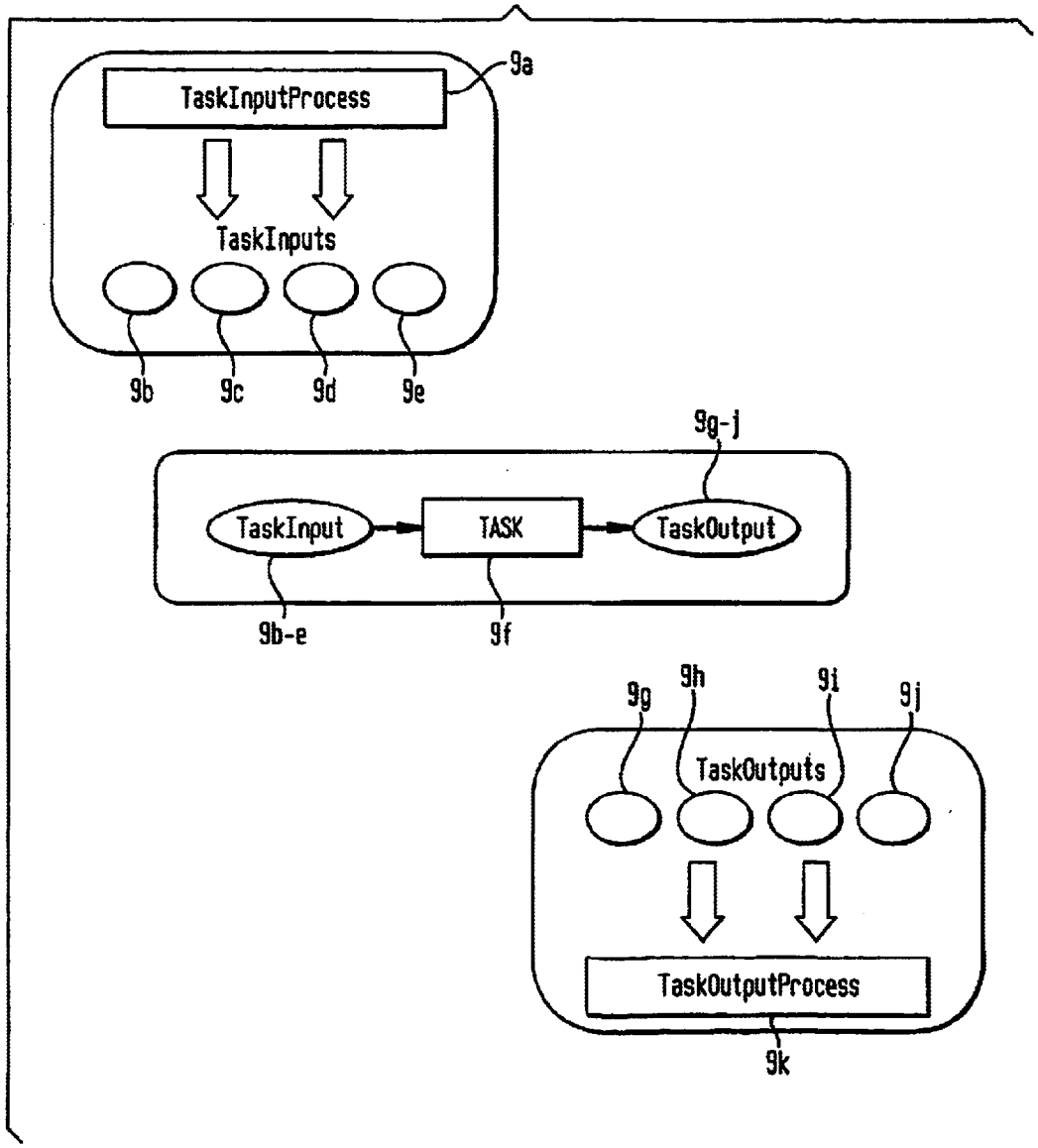
FIG. 3 illustrates aspects of the datasynapse/SecureWebProc tasking API.

Reference is now made to FIG. 3, which illustrates aspects of datasynapse/SecureWebProc's tasking API. Five user inputs—illustratively depicted as TaskInputProcess 9a, TaskInput(s) 9b–e; Task 9f, TaskOutput(s) 9g–j and TaskOutputProcess 9k—provide a customer flexibility to determine how best to extract task inputs from its database and return task outputs to its application. A feature of datasynapse's API is to permit nested and recursive parallel computations, which enables a user to submit multiple jobs in batches and not in sequential processing.

Figure 4:
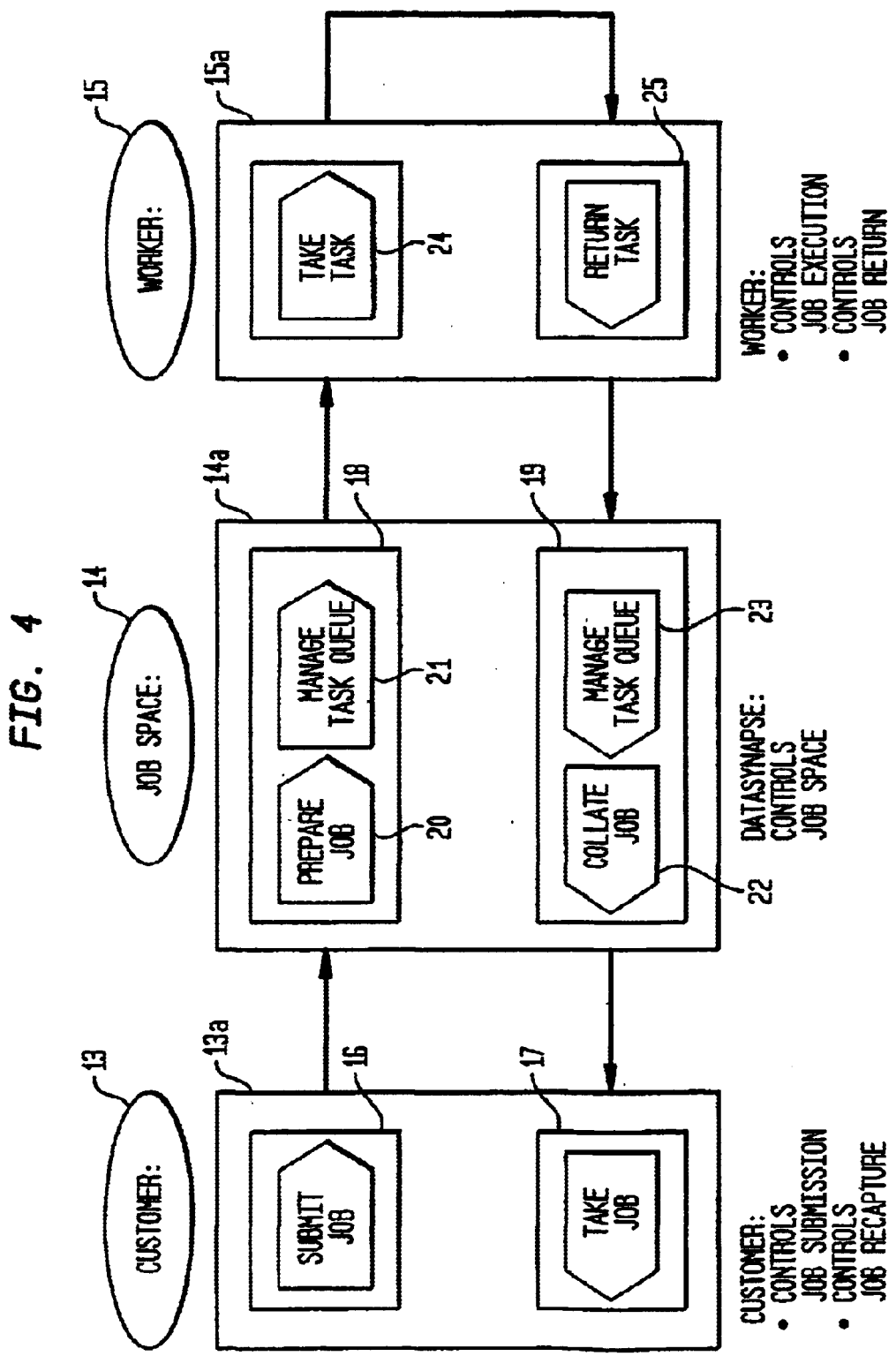
FIG. 4 illustrates aspects of the datasynapse/SecureWebProc job submission process.

Reference is now made to FIG. 4, which illustrates aspects of the datasynapse/SecurewebProc job submission process. A theme underpinning the datasynapse network design is the concept of implementing a loosely coupled system. In such a system, the coordination between each link is standardized in such a way that data can be passed between links without a need for complex messaging, or centralized coordination extending deep into successive links.

Considering first the customer's perspective 13, a customer engine 13a submits a job 16 and takes back results 17. This proactive approach reduces the need at the JobSpace level to extend software coordination into the customer site beyond the stub and engine. It further simplifies the overall coupling, as JobSpace does no planning whatsoever, nor does it do any pushing back to the customer.

From the JopSpace perspective 14, JobSpace 14a reacts dynamically to job submissions, breaking them down into discrete tasks and queuing them for execution 20, and reacts dynamically to customer requests for job results, by combing the queue for finished job entries 23 and passing them along accordingly 22. Similarly, from the worker perspective 15, the worker 15a reports to JobSpace for work, if available, and takes/processes/returns work 24–25 once finished. If a worker task is not completed within expected amount of time, the task is preferably re-prioritized in the task queue for the next worker. (This provides an important security check, since out-of-the-ordinary worker execution time is likely to accompany an attempted security breach by the worker processor.) JobSpace dynamically matches high-capacity workers (e.g., the worker registry can differentiate workers in terms of CPU speed, bandwidth, security profile, track record, and average times on-line, etc.) with equivalent utilization tasks, whenever feasible.

Figure 5:
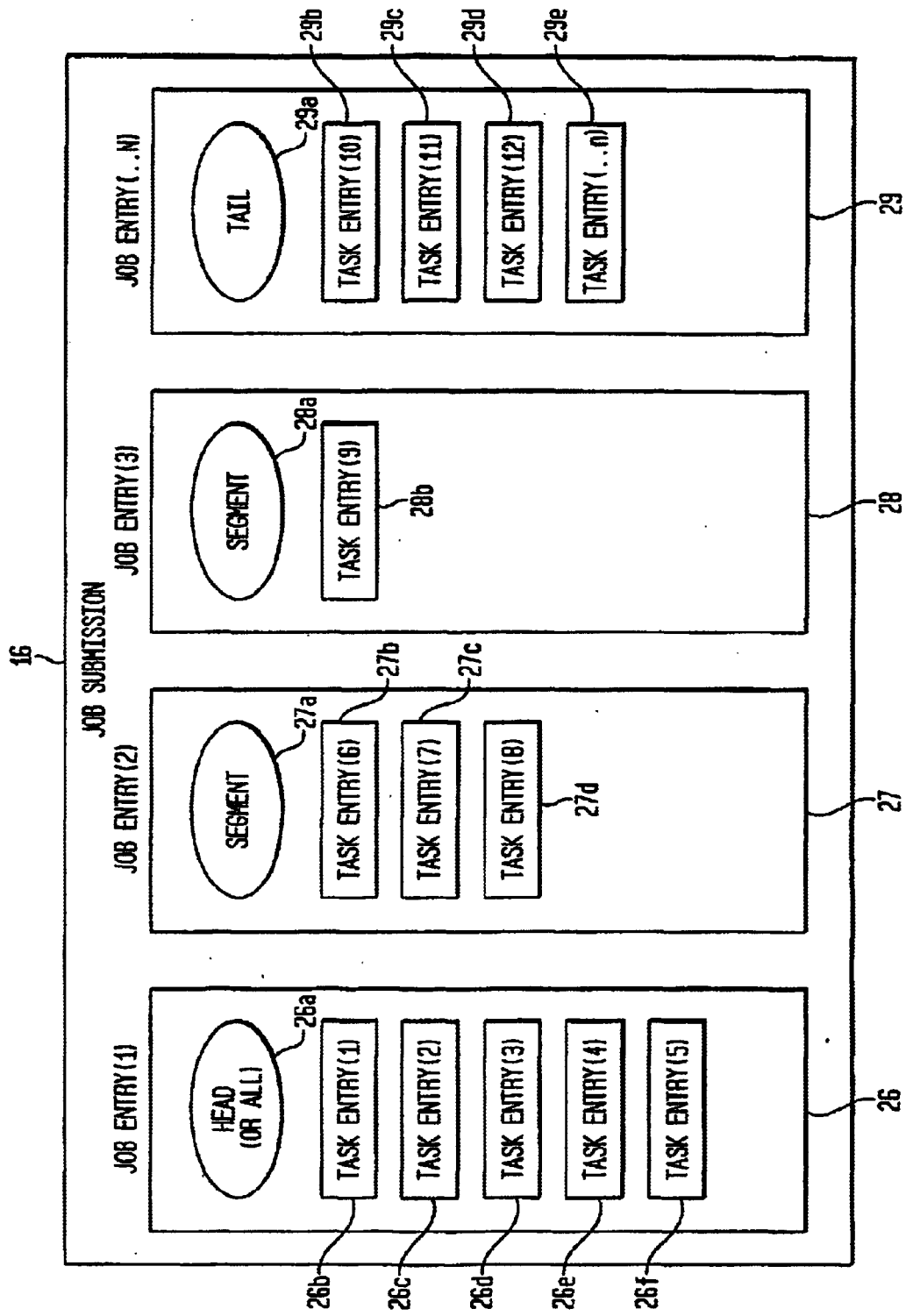
FIG. 5 illustrates further aspects of the datasynapse/SecureWebProc job submission process.

Reference is now made to FIG. 5, which illustrates further aspects of the datasynapse/SecurewebProc job submission process. A job 16 is comprised of a series of Job Entries 26–29. There may be one or more Job Entries for each specific run-time Job Submission. Each Job Entry 26–29 includes an element descriptor 26a–29a and one or more Task Entries 26b–f, 27b–d, 28b, 29b–e. In the event there is only one Job Entry, the element descriptor will register "All." Otherwise, the first Job Entry 26a will register "Head" and the last 29a will register "Tail." Job Entries in between 27a–28a will each be registered as "Segment."

Each Job Entry can contain one or more tasks. The customer does not get involved in determining how tasks are packed into job entries for submission to datasynapse; the customer only identifies the number of tasks and the priority of its overall job mission to the SecureWebProc customer engine, which automatically packs tasks into job entries according to datasynapse's efficient packing algorithms.

Tasks are preferably subject to the following attributes:

(1) They share the same java archive ("jar") file. In other words, individual tasks can utilize different portions of the master instruction set, enabling distinct behavior (polymorphic), but must access one common instruction file.

(2) They are prepared and post-processed within the same customer virtual machine. This enables a customer maximum flexibility to integrate the results with their proprietary, in-house applications and data facilities. This preserves a further security wall in terms of revealing final aggregated and interpretive results only to a customer's in-house team. Datasynapse provides the time-consuming processing of the intermediate results.

(3) The tasks share the same job context For example, parameters and properties at the job level are shared by all-tasks. These attributes are set at job submission time.

(4) They can be arbitrarily distinct, subject to the attributes mentioned above. For example, different data parameters and polymorphic behavior is permitted.

Figure 6:
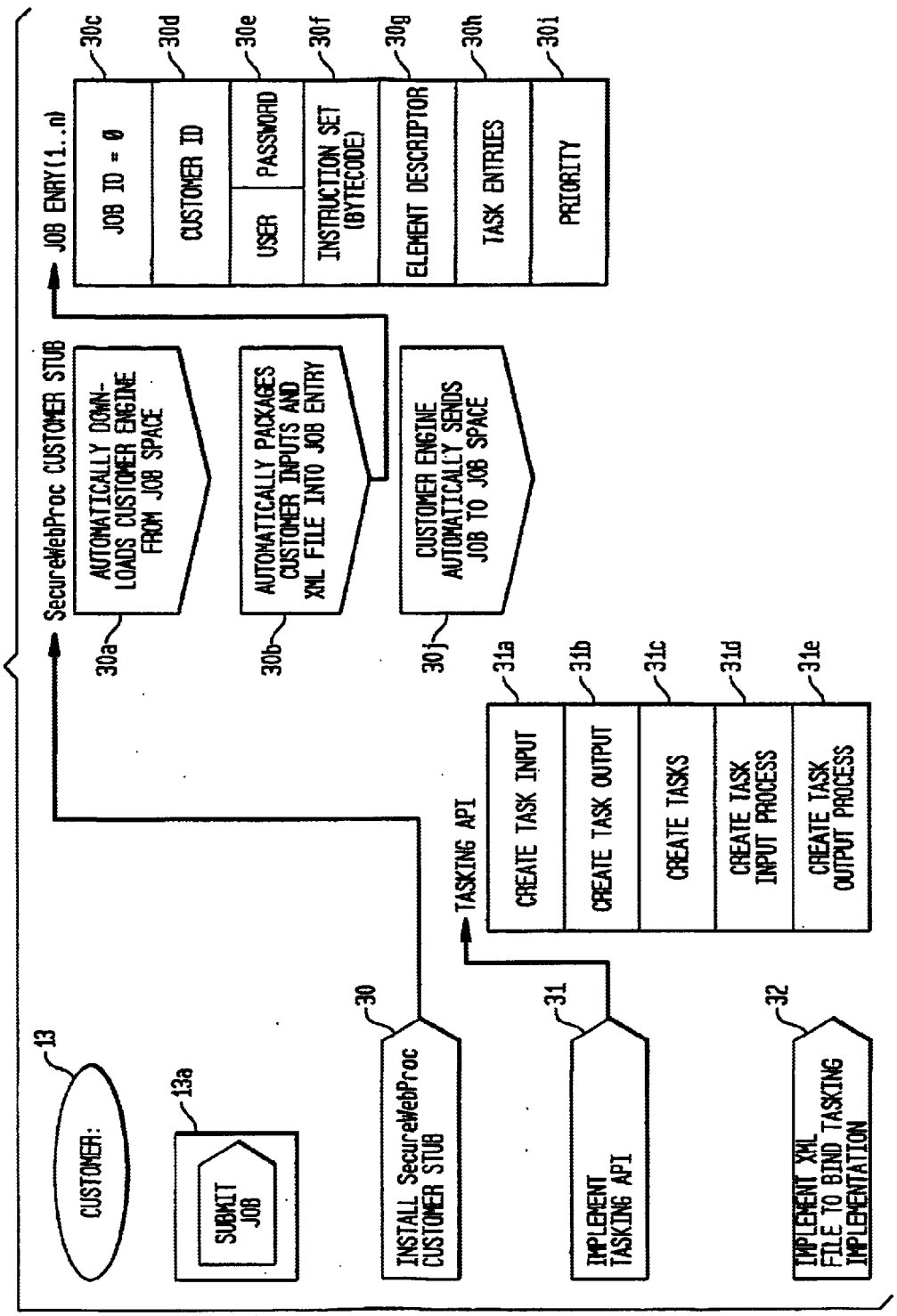
FIG. 6 illustrates aspects of the datasynapse/SecureWebProc job submission process, from a customer perspective.

Reference is now made to FIG. 6, which illustrates aspects of the datasynapse/SecureWebProc job submission process, from a customer perspective 13. From a customer perspective, only three actions are necessary to integrate to datasynapsels platform. First, the stub must be installed 30 on a server. This process takes about 10 minutes, requires no training, and once installed provides a live interface for the user to implement its tasking API. The installed customer stub is used to automatically download the Customer Engine 30a, automatically package a Job Entry 30b, and automatically submit a packaged Job to the Job Space 30j. Packaging a job 30b preferably includes assembling a record that includes a job id 30c, customer id 30d, instruction set (preferably in bytecode) 30f, element descriptor 30g, task entries 30k, and priority 30i.

Next, the customer must implement 31 a tasking API. The Tasking API is explicitly designed to capture generalized data in a means which can most readily integrate with existing applications. Implementing a taking API preferably includes creating a task input 31a, creating a task output 31b, creating one or more task(s) 31c, creating a task input process 31d and creating a task output process 31e.

Finally, a SecureWebProcMarkup Language (XML file) enables a user to bind 32 the tasking implementation for job submission.

At all times, the customer is focused on his/her application, and is thinking at "task" level. The customer is not worried about aggregating problems into "jobs" because this is automatically done by the engine. The customer must decide: (i) how many tasks to break its overall problem into, as the more tasks, the more efficient a solution; and (ii) what priority to assign its submission. Higher service levels incur higher charges. At this point, the customer engine takes over and automates the transmission of the job to datasynapse.com. This process is analogous to packing a suitcase— the contents are determined by the customer, but the engine fits it into one or more suitcases for travel. Depending on the size of the job, the engine will send it to JobSpace in one or more Job Entries, with each Job Entry containing one or more tasks.

Figure 7:
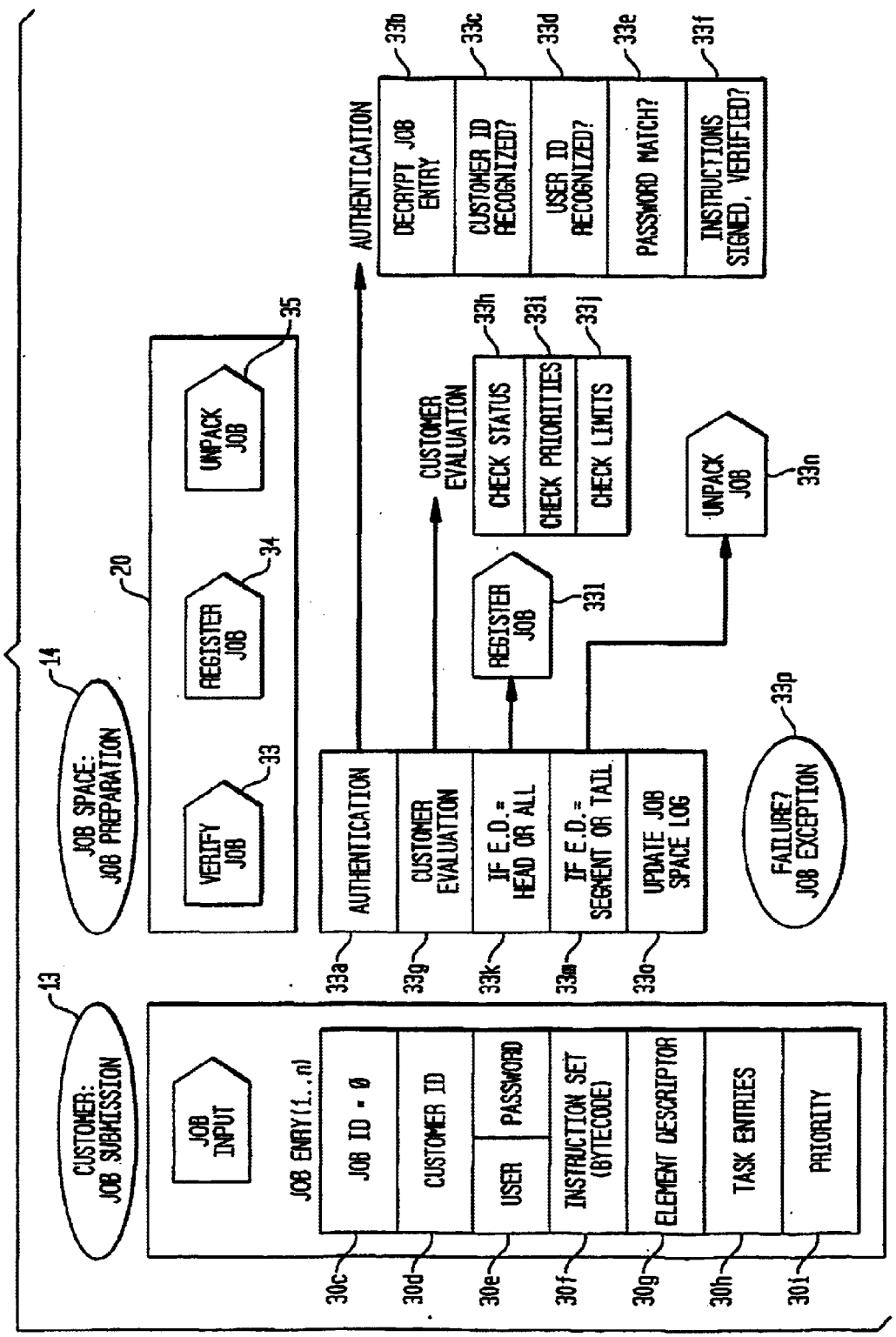
FIG. 7 illustrates aspects of the datasynapse/SecureWebProc job verification process, from a job space perspective.

Reference is now made to FIG. 7, which illustrates aspects of the datasynapse/SecureWebProc job verification process, from a job space perspective 14. Every time a customer submits a job, there is a rigorous verification process 33a, as well as an evaluation process 33b, to ascertain the specific service objectives of a particular customer. Process 33a illustratively comprises decrypting a Job Entry 33b, recognizing customer and user id's 33c–d, matching one or more password(s) 33e, and determining whether the job's instructions are properly signed and/or verified 33f. Exceptions are handled by an exception handler 33n.

After passing the initial check(s), JobSpace automatically recognizes 33k if a job submission is new (first Job Entry) or is part of an ongoing job submission 33m. If new, the job moves to the registration phase 33d. If ongoing, the job is unpacked 33n and the tasks are organized into a queue. This verification and evaluation process tightly coordinates the front and back-office issues necessary to broker jobs on a continuous basis in a secure manner.

Figure 8:
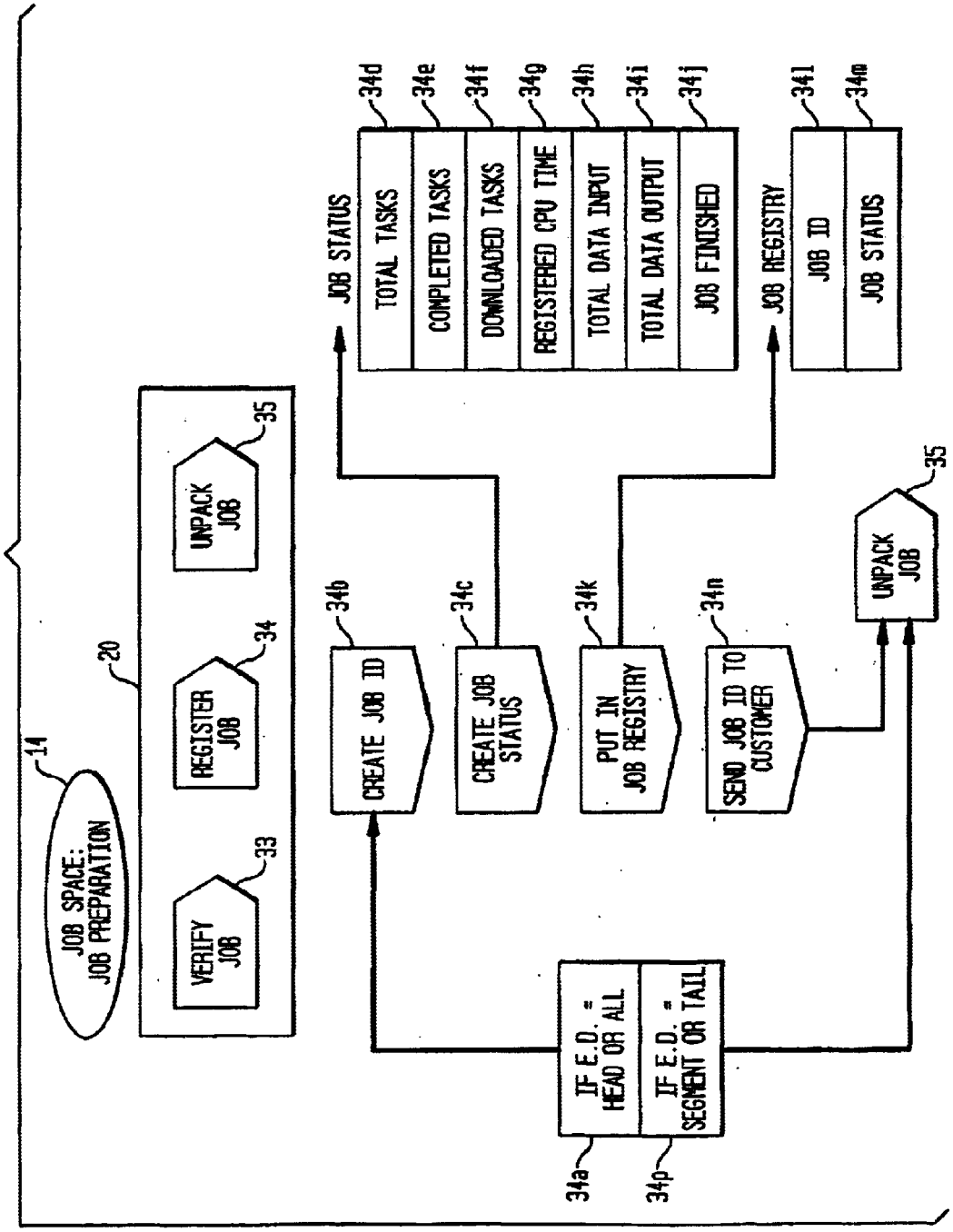
FIG. 8 illustrates aspects of the datasynapse/SecureWebProc job registration process.

Reference is now made to FIG. 8, which illustrates aspects of the datasynapse/SecureWebProc job registration process 34 from the JobSpace perspective 14. At this stage, the Job is assigned an ID 34b and status record 34c, and acknowledged in the master job registry 34k. A job status record illustratively includes an indication of total tasks 34d, completed tasks 34e, downloaded tasks 34f, CPU time 34g, total data input 34h, total data output 34i and task completion time 34j. JobSpace can monitor the job registry on a macro basis to ensure that there are no job exceptions, and to fine tune network performance as required.

Figure 9:
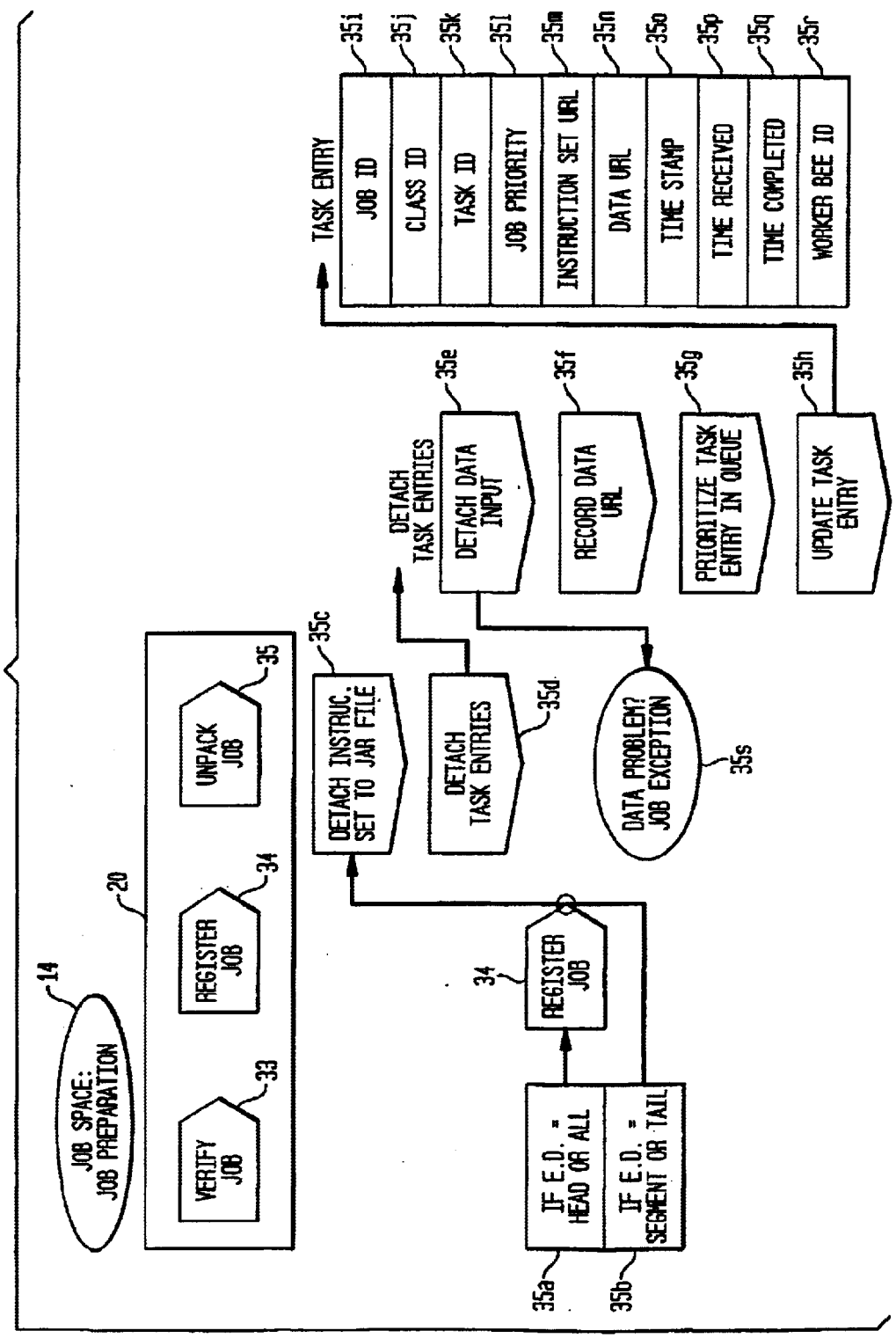
FIG. 9 illustrates aspects of the datasynapse/SecurewebProc job unpacking process.

Reference is now made to FIG. 9, which illustrates aspects of the datasynapse/SecureWebProc job unpacking process 35 from a JobSpace perspective 14. Once a job submission has been verified 33 and registered 34, JobSpace detaches its master instruction set to a Java archive (Jar) file 35c and records the URL address for the instruction set in each specific task entry. This jar file is accessible on the web to worker bees involved in executing job-related tasks. Next, the task entries are detached 35d. This involves detaching the data input 35e and recording its URL address in its place 35f. By detaching both the instruction set and accompanying data for each task entry, JobSpace is making each task entry a lightweight hand-off. It also decentralizes the storage of instructions and data outside the JobSpace activity circle, which is one of the reasons why JobSpace can scale so comfortably to internet levels of coordination.

This methodology of detaching data has a further advantage in that the customer has flexibility to preempt the sending of data in the original job submission, and can instead keep its data in a remote location. The customer has flexibility to escalate its security levels as well, in that both the instruction set and data can be encrypted, if so required. The detached task entry is put into the task queue 35f where it waits for a worker to pick it up. Records are stored regarding the time such a task entry was created, as well as when a worker received the task for processing, and completed the task. This enables datasynapse to measure both the transmission latency time and the raw task-crunching processing time as distinct time elements. Illustratively, a task entry record may include job id 35i, class id 35j, task id 35k, job priority 35l, instruction set URL 35m, data URL 35n, one or more time stamp(s) 35o (including time of receipt 35p and time of completion 35q), and a worker bee id 35r.

Figure 10:
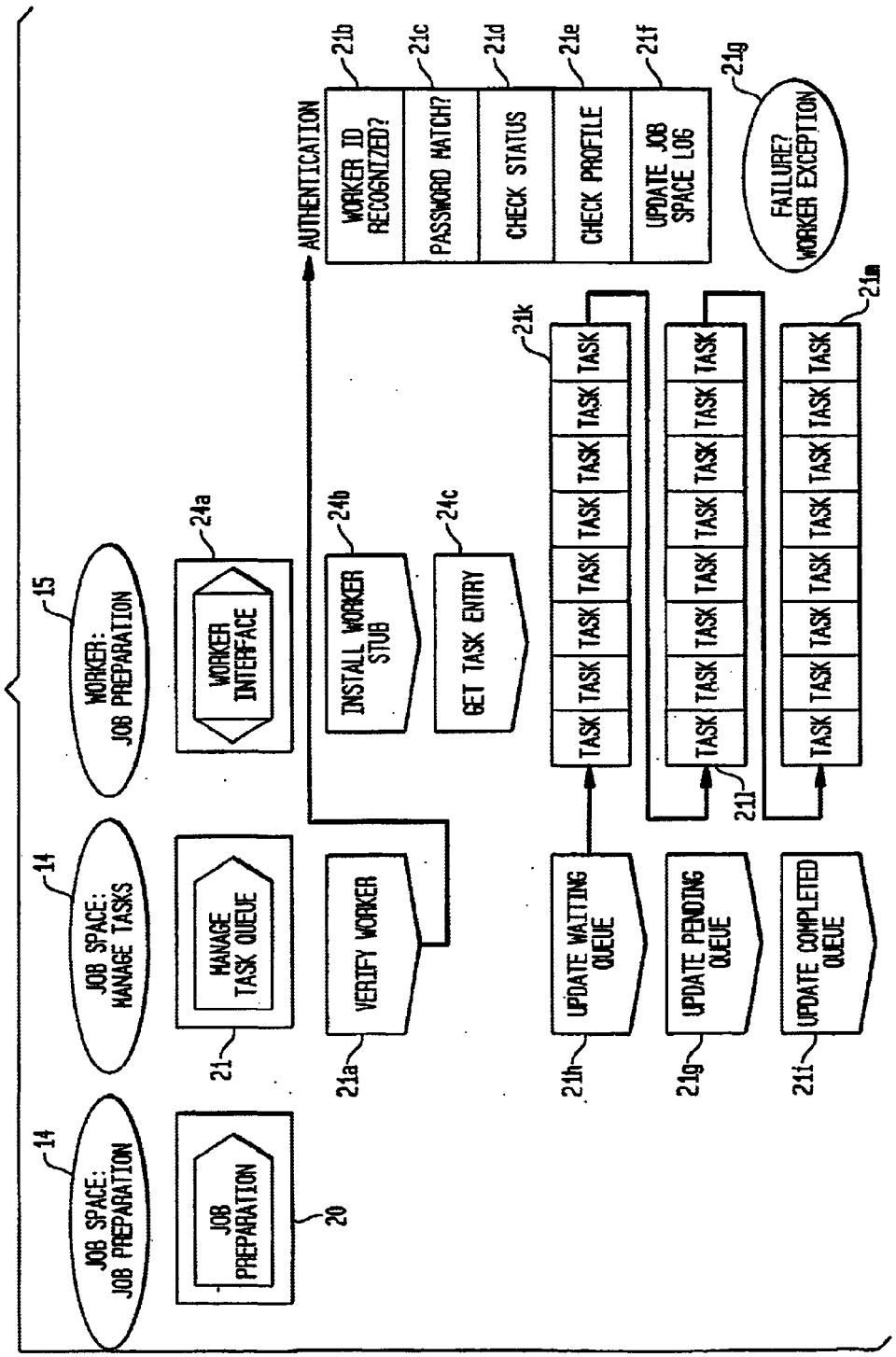
FIG. 10 illustrates aspects of the datasynapse/SecureWebProc task management process.

Reference is now made to FIG. 10, which illustrates aspects of the datasynapse/SecureWebProc task management process 21, from a JobSpace perspective 14. An important aspect of the SecureWebProc software platform is its ability to dynamically broker demand with supply, efficiently matching resources. The task queue is the mechanism where workers take the "unpacked suitcase items" for processing and returns them when finished.

Once a worker has been appropriately verified 21a and its capabilities/track record assessed 21e, JobSpace matches tasks 24c to workers in the waiting queue 21k according to the most appropriate fit, depending on priority, ability, and latency in the pending queue. This capability accounts for the robustness of the SecureWebProc software in terms of fault tolerance. JobSpace sweeps the pending queue 211 and compares how long a task has been waiting relative to the average time it has taken other similar tasks in the same job class to be processed. If too long a delay has occurred, JobSpace resubmits the task from the pending queue, to the waiting queue, and re-prioritizes its ranking if necessary. To the extent workers fail the verification process or are otherwise aberrant in behavior 21g, JobSpace takes note and shuts them down from accessing the network, and/or for security reasons. As tasks are competed, they are placed in the competed queue 21m. All queues are kept up to date 21g–i.

Figure 11:
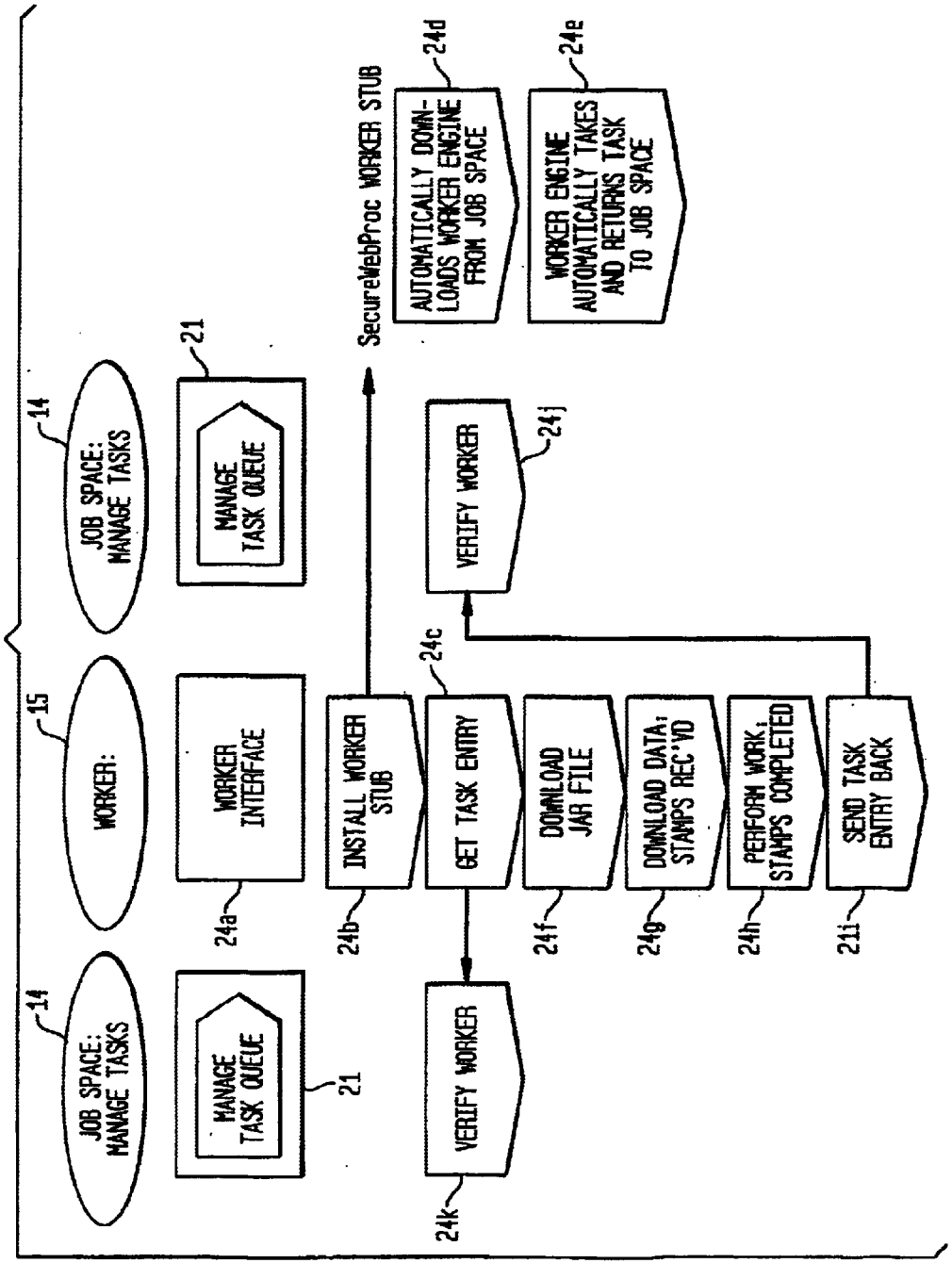
FIG. 11 illustrates aspects of the datasynapse/SecureWebProc worker interface.
Figure 12:
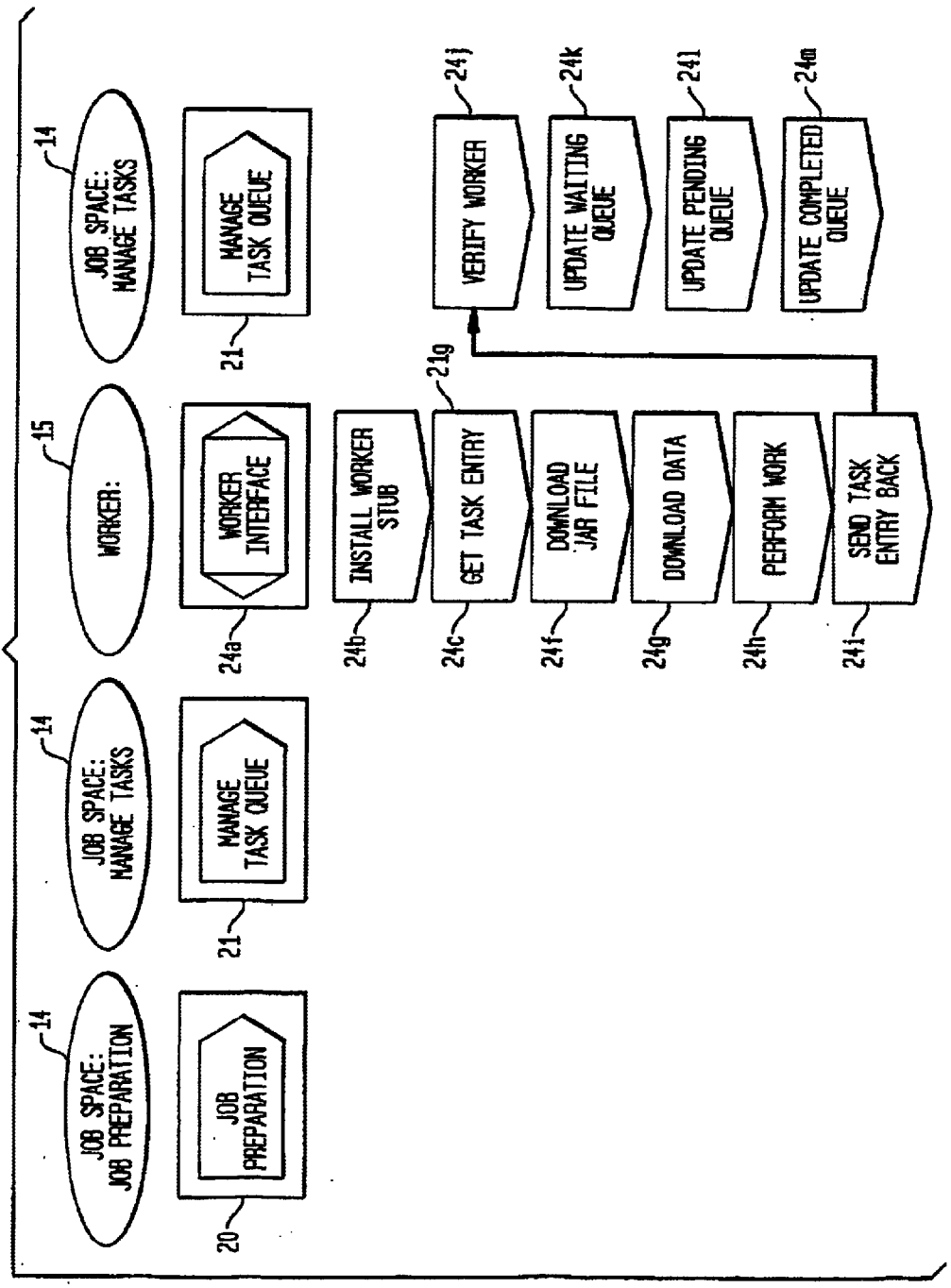
FIG. 12 illustrates aspects of the datasynapse/SecureWebProc task return process.

Reference is now made to FIG. 11, which illustrates aspects of the datasynapse/SecureWebProc worker interface 24a, from a worker perspective 15. Similar to the customer, a registered worker needs to install a lightweight worker stub 24b in order to access the datasynapse JobSpace. Workers need do nothing else, however, once this download has been installed. The engine automatically interacts with JobSpace to get task entries 24c, download jar files 24f, download data 24g, perform work 24h, and return completed tasks 24i thereafter.

The worker is verified upon taking 24k and submitting 24j tasks. Workers build a profile in the Beekeeper registry so that JobSpace can determine how best to match specific tasks against specific workers on a rolling basis. This type of expert system balances matching against waiting time to optimize network arbitrage opportunities, and provides a basis for assessing worker performance, thereby enabling detection of aberrant performance.

Worker security is preferably implemented using a "sandbox" approach. The rules of the datasynapse sandbox preferably dictate: (i) no local disk access while processing datasynapse.com jobs; (ii) strict compliance with security features where the worker bee cannot pass on its data to any other URL address other than datasynapse's Beekeeper server, or the designated Queen bee connection; (iii) registered worker bees cannot be activated unless the specific instruction set received has been signed by datasynapse, verified, and encrypted; and (iv) no printing, no manipulation of local environment networks, and absolutely no content can be executed.

Reference is now made to 12, which illustrates aspects of the datasynapse/SecureWebProc task return process, from a JobSpace perspective 14. Once a worker passes the verification process 24j, its returned task is placed into the completed queue and the pending 241 and completed 24m queues are adjusted to reflect this. This elegant queuing management process isolates the core engine from burdensome and integrated data storage requirements.

When the worker returns its task to JobSpace, the task is still lightweight because the task results (data output), is written back to the Data URL. In this way, the return of a task is identical to the taking of a task. Both activities are explicitly designed to keep the JobSpace engine clean of data and highly scalable as jobs are processed.

Figure 13:
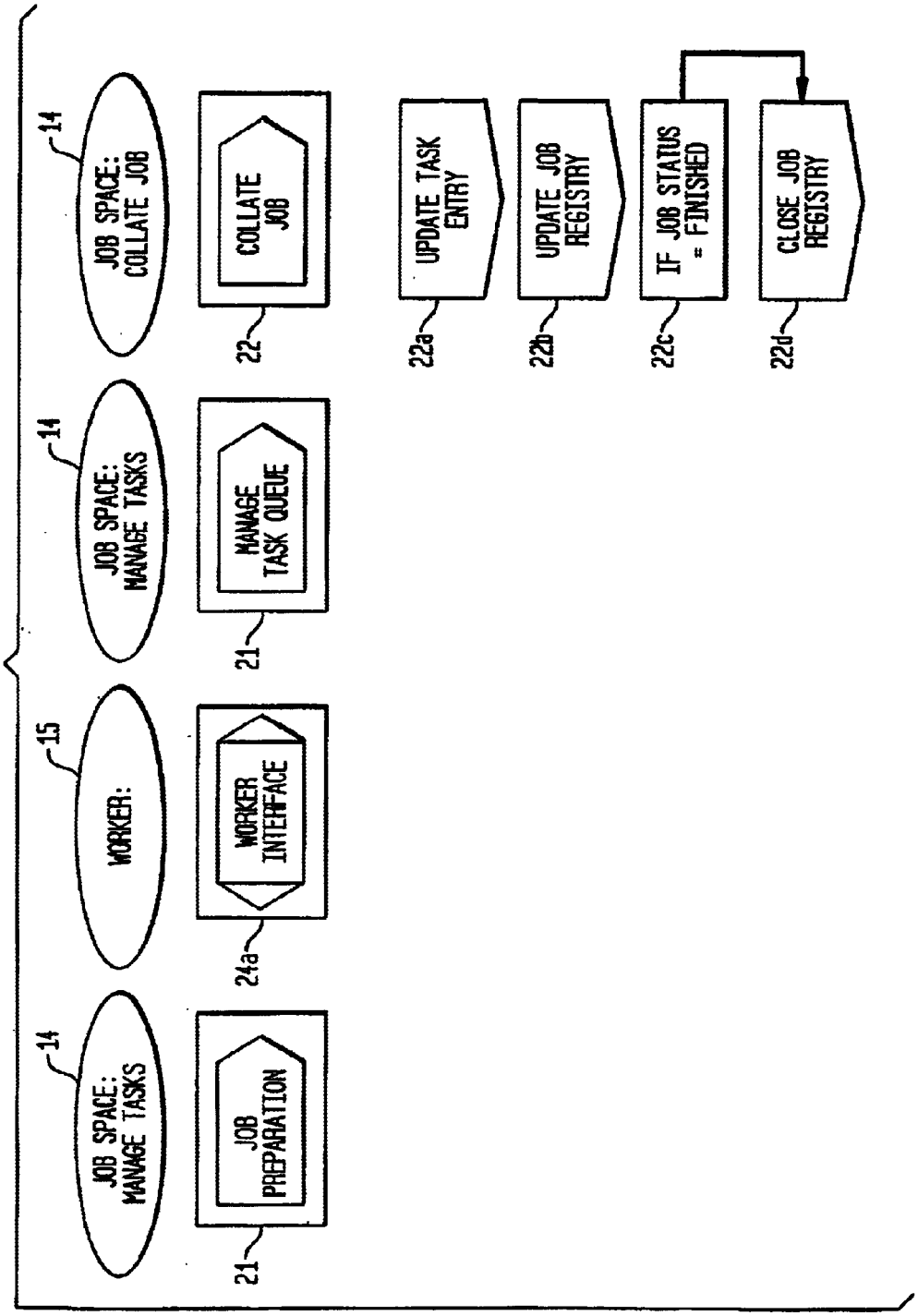
FIG. 13 illustrates aspects of the datasynapse/SecureWebProc job collation process.

Reference is now made to FIG. 13, which illustrates aspects of the datasynapse/SecureWebProc job collation process 22, from a JobSpace perspective 14. After the queue has been adjusted, JobSpace collates tasks according to its Job ID once a customer returns to JobSpace to take back its processed job. The interrogation of JobSpace by a customer seeking to take back a particular job triggers a search of the completed task queue and a re-packing of tasks into job entry format for transport back to the customer's application level. Task entries 22a and the job registry 22b are then appropriately updated and the job registry is closed 22d if job status=finished 22c. This "collating" process is highly efficient, responding dynamically to demand from customer to return completed tasks as they roll in, and not to wait for the whole job to be accomplished. Similar to the unpacking, this enables the customer to begin integrating immediately the results as they accumulate and expedites overall throughput through the JobSpace system.

Figure 14:
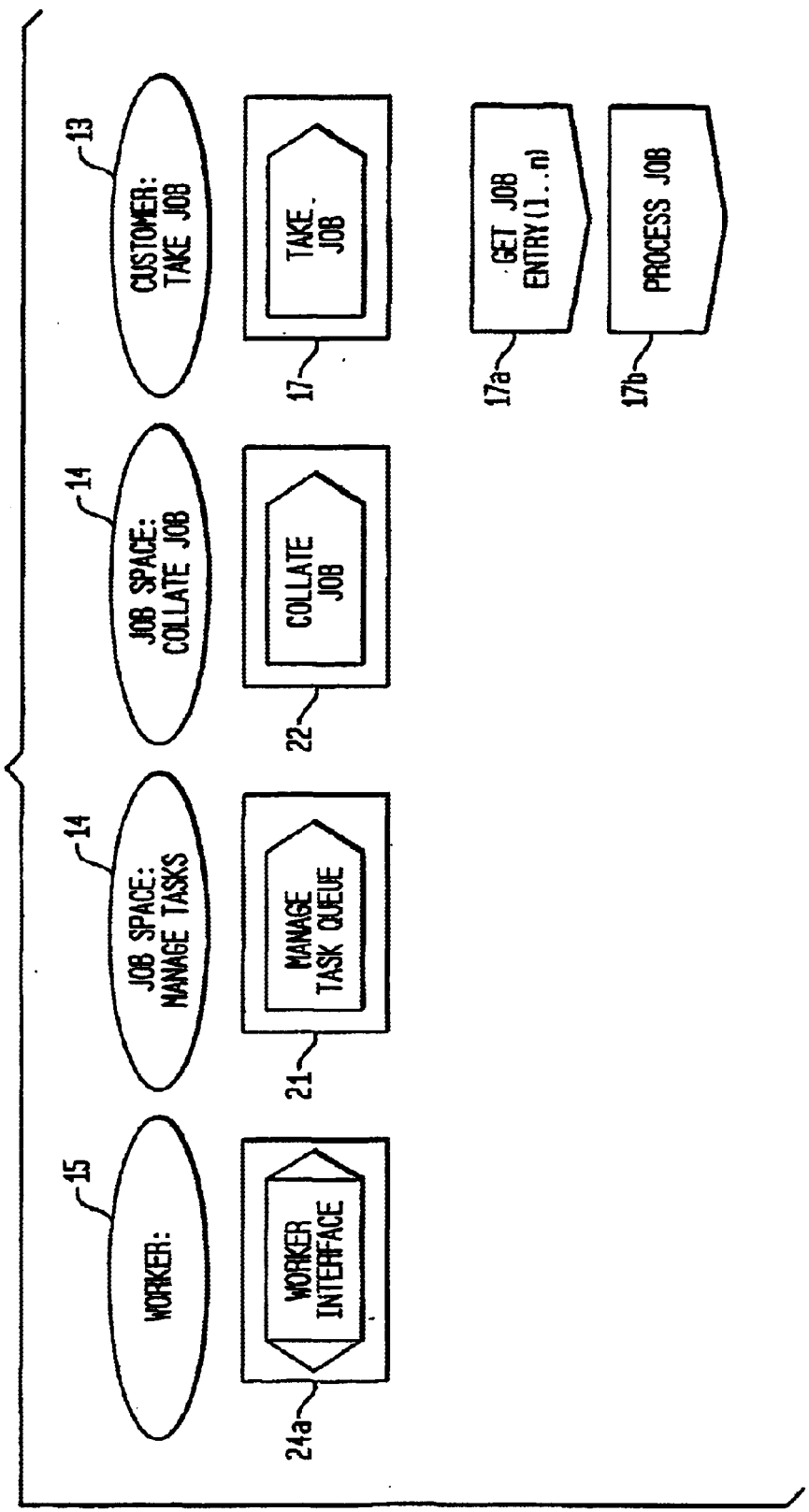
FIG. 14 illustrates aspects of the datasynapse/SecureWebProc job return process.

Reference is now made to FIG. 14, which illustrates aspects of the datasynapse/SecureWebProc job return process, from a customer perspective 13. Job entries, once packed with completed tasks, can be processed by the customer's existing applications. The customer may take 17 a job by getting the completed Job Entry(ies) 17a and processing 17b it (or them). JobSpace preferably does not integrate further, because: (i) it is likely that a customer will seek to keep its end result proprietary, and take the intermediate results obtained through datasynapse and finalize analysis in its own environment; and (ii) it is unlikely that the processing of intermediate results will in itself be a parallelizable task and should therefore not be handled within the confines of JobSpace.

Figure 15:
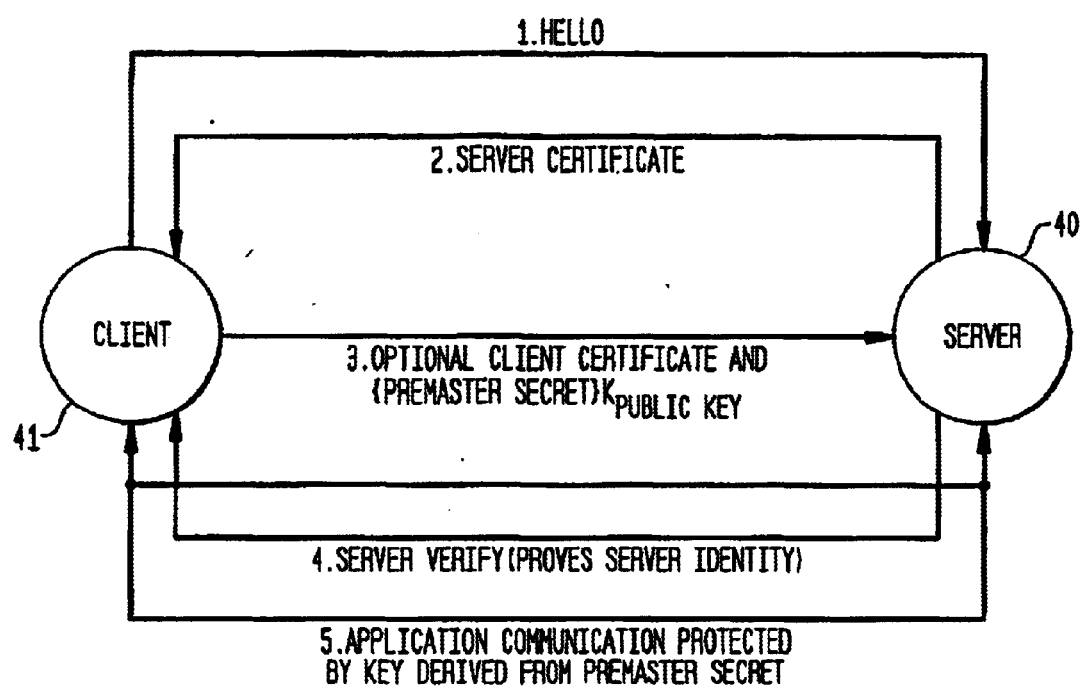
FIGS. 15–16 depict aspects of the datasynapse/SecureWebProc security architecture.
Figure 16:
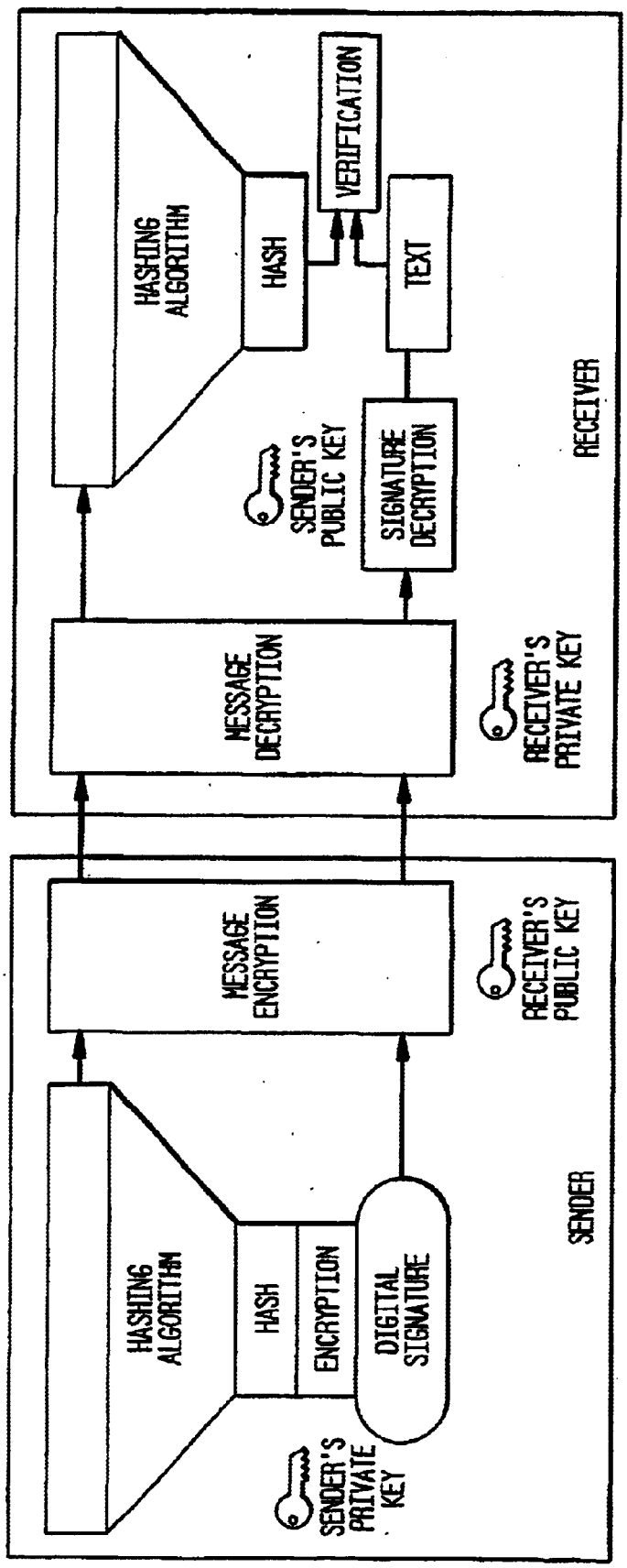

FIGS. 15–16 illustrate aspects of the SecureWebProc security architecture, that permits secure message transmission, identification and authentication of the various client 41 and server 40 components of the datasynapse distributed processing network.

FIGS. 17–21 contain exemplary code segments, which segments will be self-explanatory to persons skilled in the art. These segments exemplify the previously-described TaskInput 9b–e (FIG. 17), TaskOutput 9g–j (FIG. 18), Task 9f (FIG. 19), TaskInputProcess 9a (FIG. 20) and TaskOutputProcess 9k (FIG. 21) aspects of the datasynapse/SecureWebProc tasking API.

What we claim is:

1. A distributed computing system, implemented as a multi-tiered server/meta-server architecture using a plurality of network-connected processing elements, the distributed computing system comprising:
   at least one network-connected processing element configured as a director;
   a plurality of network-connected processing elements configured as brokers;
   a plurality of network-connected processing elements configured as engines; and,
   at least one network-connected processing element configured as a driver;
   wherein:
      the director is configured to (i) maintain a registry of driver(s), (ii) maintain a registry of engines, (iii) maintain load balance among brokers, and (iv) assign driver(s) to broker(s);
      the brokers are configured to (i) receive job(s), each comprised of at least one task and at least some comprised of a plurality of tasks, from their assigned driver(s), (ii) manage the execution of said task(s) by engine(s), and (iii) collate result(s) of executed task (s), so as to make completed job(s) available for delivery to driver(s);
      each of the brokers is further configured to maintain a plurality of task queues for each active job, the plurality of queues including (i) a waiting task queue of task(s) that have not yet been assigned to an engine for execution, wherein the order of tasks in the waiting task queue represents the order in which tasks will be assigned to available engines, (ii) a pending task queue of task(s) that have been assigned to an engine, but have not completed, and (iii) a completed task queue of task(s) that have been executed by an engine;
      the engines are configured to (i) receive tasks from the brokers, (ii) execute the received tasks, and (iii) return executed tasks to their associated brokers; and,
      at least some of the brokers are further configured to monitor their pending task queues to identify long-pending task(s) that have been pending substantially longer than an average task completion time for task(s) in the associated job, and resubmit long-pending task(s) to the job's waiting task queue;
      whereby brokers assign and supervise the execution of task(s), engines receive and execute task(s), driver(s) query assigned broker(s) to receive job results, and the director monitors the overall operation of brokers and engines.

2. A distributed computing system, as defined in claim 1, wherein said resubmitted long-pending task(s) have their ranking re-prioritized in the waiting task queue.

3. A distributed computing system, as defined in claim 1, wherein said resubmitted long-pending task(s) are placed at the front of the corresponding waiting task queue.

4. A distributed computing system, implemented as a multi-tiered server/meta-server architecture using a plurality of network-connected processing elements, the distributed computing system comprising:
   at least one network-connected processing element configured as a director;
   a plurality of network-connected processing elements configured as brokers;
   a plurality of network-connected processing elements configured as engines; and,
   at least one network-connected processing element configured as a driver;
   wherein:
      the director is configured to (i) maintain a registry of driver(s), (ii) maintain a registry of engines, (iii) maintain load balance among brokers, and (iv) assign driver(s) to broker(s);
      the brokers are configured to (i) receive job(s), each comprised of at least one task and at least some comprised of a plurality of tasks, from their assigned driver(s), (ii) manage the execution of said task(s) by engine(s), and (iii) collate result(s) of executed task (s), so as to make completed job(s) available for delivery to driver(s);
      the engines are configured to (i) receive tasks from the brokers, (ii) execute the received tasks, and (iii) return executed tasks to their associated brokers; and,
      the system is further configured to detect aberrant performance of engines performing assigned task(s)

by comparing the actual engine performance of engine(s) assigned to execute task(s) to stored performance metric(s);

whereby brokers assign and supervise the execution of task(s), engines receive and execute task(s), driver(s) query assigned broker(s) to receive job results, and the director monitors the overall operation of brokers and engines.

5. A distributed computing system, implemented as a multi-tiered server/meta-server architecture using a plurality of network-connected processing elements, the distributed computing system comprising:

at least one network-connected processing element configured as a director;

a plurality of network-connected processing elements configured as brokers;

a plurality of network-connected processing elements configured as engines; and, at least one network-connected processing element configured as a driver;

wherein:
the director is configured to (i) maintain a registry of driver(s), (ii) maintain a registry of engines, (iii) maintain load balance among brokers, and (iv) assign driver(s) to broker(s);

the brokers are configured to (i) receive job(s), each comprised of at least one task and at least some comprised of a plurality of tasks, from their assigned driver(s), (ii) manage the execution of said task(s) by engine(s), and (iii) collate result(s) of executed task(s), so as to make completed job(s) available for delivery to driver(s);

the engines are configured to (i) receive tasks from the brokers, (ii) execute the received tasks, and (iii) return executed tasks to their associated brokers; and, the system is further configured to detect aberrant performance of engines performing assigned task(s) by comparing the actual performance of multiple engines executing similar tasks;

whereby brokers assign and supervise the execution of task(s), engines receive and execute task(s), driver(s) query assigned broker(s) to receive job results, and the director monitors the overall operation of brokers and engines.

6. A distributed computing system, implemented as a multi-tiered server/meta-server architecture using a plurality of network-connected processing elements, the distributed computing system comprising:

at least one network-connected processing element configured as a director;

a plurality of network-connected processing elements configured as brokers;

a plurality of network-connected processing elements configured as engines; and, at least one network-connected processing element configured as a driver;

wherein:
the director is configured to (i) maintain a registry of driver(s), (ii) maintain a registry of engines, (iii) maintain load balance among brokers, and (iv) assign driver(s) to broker(s);

the brokers are configured to (i) receive job(s), each comprised of at least one task and at least some comprised of a plurality of tasks, from their assigned driver(s), (ii) manage the execution of said task(s) by engine(s), and (iii) collate result(s) of executed task(s), so as to make completed job(s) available for delivery to driver(s);

the engines are configured to (i) receive tasks from the brokers, (ii) execute the received tasks, and (iii) return executed tasks to their associated brokers; and, the system is further configured to detect aberrant performance of engines performing assigned task(s) and prevent assignment of additional tasks to engines that display aberrant performance;

whereby brokers assign and supervise the execution of task(s), engines receive and execute task(s), driver(s) query assigned broker(s) to receive job results, and the director monitors the overall operation of brokers and engines.

7. A method for operating a distributed computing system, implemented as a multi-tiered server/meta-server architecture using a plurality of network-connected processing elements, the method comprising:

configuring at least one network-connected processing element as a director;

configuring a plurality of network-connected processing elements as brokers;

configuring a plurality of network-connected processing elements as engines;

using the director to (i) maintain a registry of engines and (ii) maintain load balance among brokers;

using the brokers to (i) assign tasks to engines and (ii) manage the execution of tasks by engines;

using at least some of the brokers to (i) identify long-pending task(s) that have been pending substantially longer than an average task completion time and (ii) resubmit long-pending task(s); and, using the engines to (i) receive tasks from the brokers, (ii) execute the received tasks, and (iii) return executed tasks to their associated brokers;

whereby brokers assign and supervise the execution of tasks, engines receive and execute tasks, and the director monitors the overall operation of brokers and engines.

8. A method, as defined in claim 7, further comprising associating an increased priority with resubmitted long-pending tasks.

9. A method, as defined in claim 7, further comprising placing resubmitted long-pending tasks at the front of a waiting task queue.

10. A method for operating a distributed computing system, implemented as a multi-tiered server/meta-server architecture using a plurality of network-connected processing elements, the method comprising:

configuring at least one network-connected processing element as a director;

configuring a plurality of network-connected processing elements as brokers;

configuring a plurality of network-connected processing elements as engines;

using the director to (i) maintain a registry of engines and (ii) maintain load balance among brokers;

using the brokers to (i) assign tasks to engines, (ii) manage the execution of tasks by engines and (iii) detect aberrant engine performance by comparing the actual engine performance of engine(s) assigned to execute task(s) to stored performance metric(s); and, using the engines to (i) receive tasks from the brokers, (ii) execute the received tasks, and (iii) return executed tasks to their associated brokers;

whereby brokers assign and supervise the execution of tasks, engines receive and execute tasks, and the director monitors the overall operation of brokers and engines.

11. A method, as defined in claim 10, further comprising preventing engines that display aberrant performance from receiving additional tasks.

12. A method for operating a distributed computing system, implemented as a multi-tiered server/meta-server architecture using a plurality of network-connected processing elements, the method comprising:

configuring at least one network-connected processing element as a director;

configuring a plurality of network-connected processing elements as brokers;

configuring a plurality of network-connected processing elements as engines;

using the director to (i) maintain a registry of engines and (ii) maintain load balance among brokers;

using the brokers to (i) assign tasks to engines, (ii) manage the execution of tasks by engines and (iii) detect aberrant engine performance by comparing the actual performance of multiple engines executing similar tasks; and, using the engines to (i) receive tasks from the brokers, (ii) execute the received tasks, and (iii) return executed tasks to their associated brokers;

whereby brokers assign and supervise the execution of tasks, engines receive and execute tasks, and the director monitors the overall operation of brokers and engines.

13. A method, as defined in claim 12, further comprising preventing engines that display aberrant performance from receiving additional tasks.

14. A method for operating a distributed computing system, implemented as a multi-tiered server/meta-server architecture using a plurality of network-connected processing elements, the method comprising:

configuring at least one network-connected processing element as a director;

configuring a plurality of network-connected processing elements as brokers;

configuring a plurality of network-connected processing elements as engines;

using the director to (i) maintain a registry of engines and (ii) maintain load balance among brokers;

using the brokers to (i) assign service requests to engines and (ii) manage the servicing of service requests by engines;

using at least some of the brokers to (i) identify long-pending service requests that have been pending substantially longer than an average service request latency time and (ii) resubmit long-pending service requests; and, using the engines to (i) receive service requests from the brokers and (ii) provide requested services;

whereby brokers assign service requests and supervise their servicing, engines receive assigned service requests and perform requested services, and the director monitors the overall operation of brokers and engines.

15. A method, as defined in claim 14, further comprising associating an increased priority with resubmitted long-pending service requests.

16. A method, as defined in claim 14, further comprising placing resubmitted long-pending service requests at the front of a waiting request queue.

* * * * *